US011277644B2

(12) United States Patent
Van der Auwera et al.

(10) Patent No.: US 11,277,644 B2
(45) Date of Patent: Mar. 15, 2022

(54) COMBINING MODE DEPENDENT INTRA SMOOTHING (MDIS) WITH INTRA INTERPOLATION FILTER SWITCHING

(71) Applicant: QUALCOMM Incorporated, San Diego, CA (US)

(72) Inventors: Geert Van der Auwera, Del Mar, CA (US); Adarsh Krishnan Ramasubramonian, Irvine, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 16/459,024

(22) Filed: Jul. 1, 2019

(65) Prior Publication Data

US 2020/0007895 A1    Jan. 2, 2020

Related U.S. Application Data

(60) Provisional application No. 62/731,723, filed on Sep. 14, 2018, provisional application No. 62/727,341, (Continued)

(51) Int. Cl.
*H04N 19/82* (2014.01)
*H04N 19/105* (2014.01)
*H04N 19/176* (2014.01)

(52) U.S. Cl.
CPC .......... *H04N 19/82* (2014.11); *H04N 19/105* (2014.11); *H04N 19/176* (2014.11)

(58) Field of Classification Search
None
See application file for complete search history.

(56) References Cited

U.S. PATENT DOCUMENTS 8,750,378 B2    6/2014    Karczewicz et al.
9,008,175 B2    4/2015    Van et al.
(Continued)

FOREIGN PATENT DOCUMENTS

CN    102668569 A    9/2012
CN    102857750 A    1/2013
(Continued)

OTHER PUBLICATIONS

Van Der Auwera G., et al., "Non-CE3: Intra Simplifications", Joint Video Experts Team (JVET) of ITU-T SG 16 WP 3 and ISO/IEC14 UTC 1/50 29/WG 11, 13th Meeting: Marrakech, MA, Jan. 9-18, 2019, JVET-M0095, pp. 1-5.

(Continued)

*Primary Examiner* — Kaitlin A Retallick
(74) *Attorney, Agent, or Firm* — Shumaker & Sieffert, P.A.

(57) ABSTRACT

A video coder is configured to determine whether a condition is true for a block of a current picture of the video data. Based on the condition being true for the block, the video coder may apply a non-smoothing interpolation filter to unfiltered reference samples of the first block to generate predictive samples of the block. Based on the condition being false for the block, the video coder may apply a smoothing interpolation filter to unfiltered reference samples of the second block to generate predictive samples of the second block.

21 Claims, 8 Drawing Sheets

Related U.S. Application Data filed on Sep. 5, 2018, provisional application No. 62/693,266, filed on Jul. 2, 2018.

(56) References Cited

U.S. PATENT DOCUMENTS

| | | | |
|---|---|---|---|
| 9,654,785 | B2 | 5/2017 | Chien et al. |
| 10,070,126 | B2 | 9/2018 | Guo et al. |
| 10,142,627 | B2 | 11/2018 | Zhao et al. |
| 10,841,593 | B2 | 11/2020 | Zhao et al. |
| 2012/0082224 | A1* | 4/2012 | Van Der Auwera ... H04N 19/85 375/240.12 |
| 2012/0106640 | A1 | 5/2012 | Shen et al. |
| 2012/0183041 | A1 | 7/2012 | Maani et al. |
| 2013/0022115 | A1 | 1/2013 | Oh et al. |
| 2013/0034153 | A1 | 2/2013 | Song et al. |
| 2013/0094581 | A1 | 4/2013 | Tanizawa et al. |
| 2013/0107949 | A1 | 5/2013 | Sim et al. |
| 2013/0114707 | A1 | 5/2013 | Seregin et al. |
| 2013/0259117 | A1 | 10/2013 | Fu et al. |
| 2013/0266064 | A1 | 10/2013 | Zhang et al. |
| 2013/0267261 | A1 | 10/2013 | Nikkelen |
| 2013/0272380 | A1 | 10/2013 | Chien et al. |
| 2014/0079122 | A1 | 3/2014 | Kondow |
| 2014/0086323 | A1 | 3/2014 | Chuang et al. |
| 2014/0119439 | A1 | 5/2014 | Guo et al. |
| 2014/0133565 | A1 | 5/2014 | Lee |
| 2014/0219334 | A1 | 8/2014 | Park |
| 2015/0023405 | A1* | 1/2015 | Joshi ............ H04N 19/593 375/240.02 |
| 2015/0071352 | A1 | 3/2015 | Kim et al. |
| 2015/0078438 | A1 | 3/2015 | Lim et al. |
| 2015/0098505 | A1 | 4/2015 | Oh et al. |
| 2016/0373741 | A1 | 12/2016 | Zhao et al. |
| 2016/0373742 | A1 | 12/2016 | Zhao et al. |
| 2016/0373743 | A1 | 12/2016 | Zhao et al. |
| 2016/0373769 | A1 | 12/2016 | Zhao et al. |
| 2016/0373770 | A1 | 12/2016 | Zhao et al. |
| 2016/0373782 | A1 | 12/2016 | Zhao et al. |
| 2017/0223379 | A1 | 8/2017 | Chuang et al. |
| 2017/0244867 | A1* | 8/2017 | Yasutomi ............ H04N 1/6005 |
| 2017/0251224 | A1 | 8/2017 | Lee et al. |
| 2017/0353730 | A1 | 12/2017 | Liu et al. |
| 2018/0255304 | A1 | 9/2018 | Jeon et al. |
| 2020/0275096 | A1* | 8/2020 | Rath ............ H04N 19/11 |

FOREIGN PATENT DOCUMENTS

| | | |
|---|---|---|
| CN | 102918844 A | 2/2013 |
| CN | 103248892 A | 8/2013 |
| CN | 103262625 A | 8/2013 |
| CN | 103283222 A | 9/2013 |
| CN | 103636203 A | 3/2014 |
| CN | 103636220 A | 3/2014 |
| CN | 104170379 A | 11/2014 |
| CN | 104320666 A | 1/2015 |
| CN | 104378645 A | 2/2015 |
| CN | 104702962 A | 6/2015 |
| EP | 2773118 A1 | 9/2014 |
| JP | 2006081156 A | 3/2006 |
| JP | 2013058939 A | 3/2013 |
| JP | 2013090120 A | 5/2013 |
| JP | 2014501090 A | 1/2014 |
| JP | 2014520476 A | 8/2014 |
| JP | 2014523187 A | 9/2014 |
| JP | 2014523697 A | 9/2014 |
| JP | 2014528670 A | 10/2014 |
| JP | 2014530556 A | 11/2014 |
| KR | 20140129423 A | 11/2014 |
| KR | 20150034699 A | 4/2015 |
| WO | 2009004985 A1 | 1/2009 |
| WO | 2010039492 A2 | 4/2010 |
| WO | 2012044886 A1 | 4/2012 |
| WO | 2012170812 A1 | 12/2012 |
| WO | 2012173315 A1 | 12/2012 |
| WO | 2013000324 A1 | 1/2013 |
| WO | 2013051903 A1 | 4/2013 |
| WO | 2013067334 A2 | 5/2013 |
| WO | 2013105622 A1 | 7/2013 |
| WO | 2013154939 A1 | 10/2013 |
| WO | 2015000168 A1 | 1/2015 |
| WO | 2017084628 A1 | 5/2017 |
| WO | 2018063886 A1 | 4/2018 |

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 400 pp.

Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

JVET: "VTM-5.0, Tags, JVET/VVCSoftware VTM, GitLab", Frank Bossen, https://vcgit.hhi.fraunhofer.de/jvet/VVCSoftware_VTM/-/tags/VTM-5.0, May 7, 2019, pp. 1-3.

Tsai C., et al., "CE3-related: Simplification and Unification for Intra Reference Sample Filtering", Joint Video Experts Team (JVET) of ITU-T SG 16 WP 3 and ISO/IEC14 UTC 1/5C 29/WG 11, 15th Meeting: Gothenburg, SE, Jul. 3-12, 2019, JVET-00277-v3, Oct. 25, 2013, pp. 1-5.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Chen, et al., "Further improvements to HMKTA-1.0," ITU—Telecommunications Standardization Sector, Jun. 19-26, 2015, No. VCEG-AZ07_v2, 9 pp.

Chen J., et al., "Algorithm description for Versatile Video Coding and Test Model 1 (VTM 1)", Joint Video Exploration Learn (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v1, 11th Meeting: Ljubljana, SI, Jul. 10-18, 2018, 19 pages.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Chen J., et al., "Further Improvements to HMKTA-1.0", 52. VCEG Meeting, Jun. 19, 2015-Jun. 26, 2015, Warsaw, (Video Coding Experts Group of ITU-T SG.16), No. VCEG-AZ07, Jun. 19, 2015 (Jun. 19, 2015), 8 Pages, XP030003885.

Chen J., et al., JVET-G1001-V1 "Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting: Jul. 13, 2017-Jul. 21, 2017, Torino, Aug. 19, 2017 (Aug. 19, 2017), 51 Pages, XP030150980, p. i-iv, Retrieved from the Internet URL: http://phenix.int-evry.fr/jvet/doc_end_user/documents/7_Torino/wg11/JVET-G0001-v1.zip, p. 20, Paragraph 2.3.7—p. 23, Paragraph 2 3.7 6, p. 17, Paragraph 2.3 5—p. 18, section 2.

Chuang T-D., et al., "CE6b: Intra Prediction Mode Coding", 7. JCT-VC Meeting; 98. MPEG Meeting; Nov. 21, 2011-Nov. 30,

(56) References Cited

OTHER PUBLICATIONS

2011, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-G203, Nov. 7, 2011 (Nov. 7, 2011), XP030110187, pp. 1-6.

Cohen R., et al., "Non-CE6: Coding of luma intra prediction modes that are not in the MPM set," 98 MPEG Meeting, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G359_r2, WG11 No. m21921, 13 pages.

Ergen S., "ZigBee/IEEE 802.15.4 Summary", Sep. 10, 2004, 37 pp.

Liang et al., "A Light-weight HEVC Encoder for Image Coding," 2013 Visual Communications and Image Processing (VCIP), IEEE, Nov. 17, 2013 (Nov. 17, 2013), pp. 1-5, XP032543699, DOI: 10.1109/VCIP.2013.6706448.

Filippov A., et al., "CE3: A Combination of Tests 3.1.2 and 3.1.4 for Intra Reference Sample Interpolation Filter", Joint Video Experts Team (JVET) of ITU-T SG 16 WP 3 and ISO/IEC JTC 1/SC 29/WG 11, JVET-L0628-v2, Oct. 2018, 5 pages.

Guo M., et al., "Improved Intra Mode Coding", Joint Collaborative Team on Video Coding (JCT-VC) of ITU-T SG16 WP3 and ISO/IEC JTC1/SC29/WG11, 4th Meeting: Daegu, Korea, Jan. 2011, JCTVC-D166, pp. 1-7.

International Search Report and Written Opinion—PCT/US2019/040306—ISA/EPO—dated Sep. 26, 2019.

H.264 Prediction ; "Chapter 6" In:Iain E. Richardson: "The H.264 Advanced Video Compression Standard, 2nd Edition",Apr. 20, 2010 (Apr. 20, 2010), Wiley,XP030001637,ISBN: 978-0-470-51692-8 pp. 137-177.

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITu-T H.265, "Series H: Audiovisual and Multimedia Systems, Infrastructure of audiovisual services—Coding of moving video, High efficiency video coding," The International Telecommunication Union. Dec. 2016, 664 pp.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Iwamura S., et al., "Description of SDR and HDR video coding technology proposal by NHK and Sharp", 10. JVET Meeting; Oct. 4, 2018-Apr. 20, 2018; San Diego; (The Joint Video Exploration Team of ISO/IEC JTC1/SC29/WG11 and ITU-T SG.16 ); url:http://phenix.int-evry.fr/jvet/ ,No. JVET-J0027, Apr. 2, 2018 (Apr. 2, 2018), XP030151195, 40 Pages, Section 2.1.8 Intra Prediction.

Kim D-Y., et al., "A New Method for Estimating Intra Prediction Mode in H.264/AVC", IEICE Trans. Fundamentals of Electronic Communication and Computer Science, vol. E91-A, No. 6, Jun. 2008, pp. 1529-1532.

Koo M., et al., "Description of SDR video coding technology proposal by LG Electronics", 10. JVET Meeting; Oct. 4, 2018-Apr. 20, 2018; San Diego; (The Joint Video Exploration Team of ISO/IEC JTC1/SC29/WG11 and ITU-T SG.16 ); URL:http://phenix.int-evry.fr/jvet/, No. JVET-J0017, Apr. 3, 2018 (Apr. 3, 2018), XP030151177, 70 Pages, Section 2.1.8 Intra prediction.

Lainema J., et al., Chapter 4 Intra-Picture Prediction in HEVC, In: "High Efficiency Video Coding (HEVC)", vol. 29, pp. 91-112, Aug. 1, 2014 (Aug. 1, 2014), Springer International Publishing, XP055292569, ISBN: 978-3-319-06894-7.

Lainema J., et al., "Intra Coding of the HEVC Standard", IEEE Transactions on Circuits and Systems for Video Technology, Institute of Electrical and Electronics Engineers, USA, vol. 22, No. 12, Dec. 1, 2012 (Dec. 1, 2012), XP011487148, pp. 1792-1801.

Lee S-H., et al., "Fast Intra Prediction Mode Decision based on Rough Mode Decision and Most Probable Mode in HEVC", JBE vol. 19, No. 2, Mar. 2014, 8 pages.

Lehmann T.M., et al., "Survey: Interpolation Methods in Medical Image Processing", IEEE Transactions on Medical Imaging, IEEE Service Center, Piscataway, NJ, US, vol. 18, No. 11, Nov. 1, 1999 (Nov. 1, 1999), pp. 1049-1075, XP011035921, ISSN: 0278-0062.

Matsuo S., et al., "Improved Intra Angular Prediction by DCT-Based Interpolation Filter", IEEE Proceedings of the 20th European Signal Processing Conference (EUSIPCO), Aug. 27, 2012 (Aug. 27, 2012), pp. 1568-1572, XP032254770, ISBN: 978-1-4673-1068-0.

Matsuo Y., et al., "Video Coding of 8K UHDTV by HEVC/H.265 With Spatio-Gradational Reduction and Its Restoration", Picture Coding Symposium (PCS), May 31-Jun. 3, 2015, pp. 40-44, ISBN: 978-1-4799-7783-3.

Sullivan G.J., et al., "Overview of the High Efficiency Video Coding (HEVC) Standard", IEEE Transactions on Circuits and Systems for Video Technology, IEEE Service Center, Piscataway, Nj, US, vol. 22, No. 12, Dec. 1, 2012, XP011487803, pp. 1649-1668, ISSN: 1051-8215, DOI: 10.1109/TCSVT.2012.2221191 the whole document.

Isze V., et al., "High Efficiency Video Coding (HEVC): Algorithms and Architectures", Springer international Publishing Switzerland, 384 pp, ISSN 1558-9412, Springer-2014.

Van Der Auwera (QUALCOMM) G., et al., "CE3: Intra reference sample interpolation filter selection using MDIS conditions (Test 3.1.2)", 12. JVET Meeting; Oct. 3, 2018-Oct. 12, 2018; Macao; (The Joint Video Exploration Team of ISO/IEC JTC1/SC29/WG11 and ITU-T SG.16) No. JVET-L0324, Sep. 25, 2018 (Sep. 25, 2018), XP030193846, 10 Pages, Retrieved from the Internet: URL:http://phenix.int-evry.fr/jvet/doc_end_user/documents/12_Macao/wg11/JVET-L0324-v1.zip JVET-L0324_v1.docx [retrieved on Sep. 25, 2018] Section 2 Proposal.

Van Der Auwera (QUALCOMM) G., et al., "CE3-related: On MDIS and intra interpolation filter switching", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0064, Jul. 13, 2018 (jul. 13, 2018), XP030199604, 7 Pages, Retrieved from the Internet: URL:http://phenix.int-evry.fr/jvet/doc_end_user/documents/11_Ljubljana/wg11/JVET-K0064-v2.zip JVET-K0064_v2.docx [retrieved on Jul. 13, 2018] Section 2 Proposal.

Vatis Y., et al., "Two-Dimensional Non-Separable Adaptive Wiener Interpolation Filter for H.264/AVC", 72, MPEG Meeting, Apr. 18, 2005-Apr. 22, 2005, Susan, (Motion Picture Expert Group or ISO/IEC JTC1/SC29/WG11), No. M11845, Apr. 29, 2005 (Apr. 29, 2005),6 Pages, XP030040567, ISSN: 0000-0249.

Wang Y-K. et al., "High Efficiency Video Coding (HEVC) Defect Report", Joint Collaborative Team on Video Coding (JCT-VC) of ITU-T SG 16 WP3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Yeo et al., "Non-CE6: on Intra Prediction Mode Coding," JTC1/SC29/WG11, 7th Meeting, JCTVC-G153, m21706, Nov. 21-30, 2011, 12 pages, XP030110137.

Yinhe Z., et al., "A MPM based Fast Mode Decision Algorithm for Intra Prediction in HEVC", Oct. 31, 2013, pp. 1-7.

Zhao L., et al., "Fast Mode Decision Algorithm for Intra Prediction in HEVC", Visual Communications and Image Processing (VCIP), 2011, IEEE, Nov. 6, 2011 (Nov. 6, 2011), pp. 1-4, XP032081373, DOI: 10.11 09/VCIP.2011.6115979, ISBN:978-1-4577-1321-7, Abstract Section I. "Introduction" section III A "Motivating Observations" section III.B "Implementation of Proposed Fast Intra Mode Decision".

Zhu S., et al., "Fast Intra-Prediction Mode Decision Algorithm for High Efficieny Video Coding", 2014 9th IEEE Conference on Industrial Electronics and Applications, IEEE, Jun. 9, 2014 (Jun. 9, 2014), pp. 936-939, XP032665890, DOI: 10.1109/ICIEA.2014.6931297.

(56) References Cited

OTHER PUBLICATIONS

Bossen F., et al., "JVET Common Test Conditions and Software Reference Configurations for SDR video," 11th Meeting; Ljubljana, SI, Jul. 10-18, 2018, Joint Collaborative Team on Video Coding (JCT-VC) of ITU-T SG 16 WP 3 and ISO/IEC JTC 1/SC 29/WG 1, No. JVET-K1010_v2, 6 pp.

Van Der Auwera G., et al., "Description of Core Experiment 3: Intra Prediction and Mode Coding", Joint Video Experts Team (JVET) of ITU-T SG 16 WP 3 and ISO/IEC JTC 1/SC 29/WG 11, Jul. 10-18, 2018, JVET-K1023-v1, 32 pages.

Anonymous: "Preview Document JVET-L1001 for Macao Meeting," Oct. 31, 2018 (Oct. 31, 2018), XP055657004, Retrieved from the Internet: URL: http://phenix.int-evry.fr/jvet/ [retrieved on Jan. 10, 2018].

Bross B., et al., "Versatile Video Coding (Draft 2)", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K1001, Sep. 21, 2018 (Sep. 21, 2018), XP030193577, 135 Pages, Retrieved from the Internet: URL: http://phenix.int-evry.fr/jvet/doc_end_user/documents/11_Ljubljana/wg11/JVET-K1001-v6.zip JVET-K1001-v6.docx [retrieved on Sep. 21, 2018] paragraph 8.2.4.2—paragraph 8.2.4.2.9; figures 8-1, tables 8-5.

Lin P et al., "Non-CE3: Harmonization Between WAIP and Intra Smoothing Filters," smoothing filters 126. MPEG Meeting, Mar. 25, 2019-Mar. 29, 2019, Geneva, (Motion Picture Exoert Group or ISO/IEC JTC1/SC29/WG11), No. m47097, Mar. 22, 2019 (Mar. 22, 2019), XP030210668, 3 pages, Retrieved from the Internet: URL: http://phenix.int-evry.fr/mpeg/doc_end_user/documents/126_Geneva/wg11/m47097-JVET-N4035-v3-JVET-N0435-v3.zipJVET-N0435-v2.docx [retrieved on Mar. 22, 2019]the whole document.

Zhao L et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG 16 WP3), No. JVET-L0279, Oct. 6, 2018 (Oct. 6, 2018), XP030195082, pp. 1-10, Retrieved from the Internet URL:http://phenix.int-evry.fr/jvet/doc_end_user/documents/12_Macao/wg11/JVET-L0279-v3.zip JVET-L0279-vi.docx [retrieved on Oct. 6, 2018] cited in the application the whole document.

Chien W-J., et al., "Parsing friendly intra mode coding", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F459_r2, pp. 1-5.

Chuang T-D., et al.,"Luma Intra Prediction Mode Coding", 6. JCT-VC Meeting; 97. Mpeg Meeting; Jul. 14, 2011-Jul. 22, 2011; Torino; (Joint Collaborative Team on Video Coding of ISO/ IEC JTC1/SC29/WG11 and ITU-T SG. 16 ) ; URL: http://wftp3.itu/int/av-arch/jctvc-site/,, No. JCTVC-F062-r1, Jul. 15, 2011 (Jul. 15, 2011), 5 pages, XP030009085.

Francois E., et al., "CE6b: Intra mode coding with 4 MPMs and mode ranking", Joint Collaborative Team on Video Coding (JCT-VC) of ITU-T SG16 WP3 and ISO/IEC JTC1/SC29/WG11, 7th Meeting, Geneva, CH, Nov. 21-30, 2011, Document: JCTVC-G243, XP030110227, 8 pages.

"High Efficiency Video Coding, Recommendation ITU-T H.265", Series H: Audiovisual and Multimedia Systems, Infrastructure of Audiovisual Services—Coding of Moving Video, ITU-T, Telecommunication Standardization Sector of ITU, Oct. 2014, H.265, (Oct. 2014), pp. 117-119, 125-128.

Kumakura T., et al., "Intra Prediction Mode Coding based on Direction Difference," Joint Collaborative Team on Video Coding (JCT-VC) of ITU-T SG16 WP3 and ISO/IEC JTC1/SC29/WG11, 6th Meeting: Torino, IT, Jul. 2011, JCTVC-F339, pp. 1-13.

Sze V., et al., "High Efficiency Video Coding (HEVC), Integrated Circuit and Systems, Algorithms and Architectures". vol. 39, Springer, 2014, pp. 49-90, [Jan. 8, 2014].

* cited by examiner

COMBINING MODE DEPENDENT INTRA SMOOTHING (MDIS) WITH INTRA INTERPOLATION FILTER SWITCHING

This application claims the benefit of U.S. Provisional Patent Application No. 62/693,266, filed Jul. 2, 2018, U.S. Provisional Patent Application No. 62/727,341, filed Sep. 5, 2018, and U.S. Provisional Patent Application No. 62/731,723, filed Sep. 14, 2018, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for merging two smoothing filtering operations for intra prediction of directional modes: Mode Dependent Intra Smoothing (MDIS) filtering and Gaussian interpolation filtering. In some examples, this may be accomplished by applying MDIS conditions directly to decide between the two interpolation filters and eliminating the separate interpolation filter conditions.

In one example, this disclosure describes a method of decoding video data, the method comprising: determining whether a condition is true for a first block of a current picture of the video data; based on the condition being true for the first block, applying a non-smoothing interpolation filter to unfiltered reference samples of the first block to generate predictive samples of the first block; determining whether the condition is true for a second block of the current picture; based on the condition being false for the second block, applying a smoothing interpolation filter to unfiltered reference samples of the second block to generate predictive samples of the second block; reconstructing the first block based on the predictive samples of the first block; and reconstructing the second block based on the predictive samples of the second block.

In another example, this disclosure describes a method of encoding video data, the method comprising: determining whether a condition is true for a first block of a current picture of the video data; based on the condition being true for the first block, applying a non-smoothing interpolation filter to unfiltered reference samples of the first block to generate predictive samples of the first block; determining whether the condition is true for a second block of the current picture; based on the condition being false for the second block, applying a smoothing interpolation filter to unfiltered reference samples of the second block to generate predictive samples of the second block; generating residual data for the first block based on the predictive samples of the first block; generating residual data for the second block based on the predictive samples of the second block; and including, in a bitstream that includes an encoded representation of the video data, data representing the residual data for the first block and the residual data for the second block.

In another example, this disclosure describes a device for encoding or decoding video data, the device comprising: a memory storing the video data; and one or more processors configured to: determine whether a condition is true for a block of a current picture of the video data; based on the condition being true for the block, apply a non-smoothing interpolation filter to unfiltered reference samples of the block to generate predictive samples of the block; and based on the condition being false for the block, apply a smoothing interpolation filter to the unfiltered reference samples of the block to generate the predictive samples of the block.

In another example, this disclosure describes a device for encoding or decoding video data, the device comprising: means for determining whether a condition is true for a block of a current picture of the video data; means for applying, based on the condition being true for the block, a non-smoothing interpolation filter to unfiltered reference samples of the block to generate predictive samples of the block; and means for applying, based on the condition being false for the block, a smoothing interpolation filter to the unfiltered reference samples of the block to generate the predictive samples of the block.

In another example, this disclosure describes a computer-readable storage medium having stored thereon instructions that, when executed, cause one or more processors to: determine whether a condition is true for a block of a current picture of the video data; based on the condition being true for the block, apply a non-smoothing interpolation filter to unfiltered reference samples of the block to generate predictive samples of the block; and based on the condition being false for the block, apply a smoothing interpolation filter to the unfiltered reference samples of the block to generate the predictive samples of the block.

The details of one or more examples are set forth in the accompanying drawings and the description below. Other

DETAILED DESCRIPTION

Figure 1:
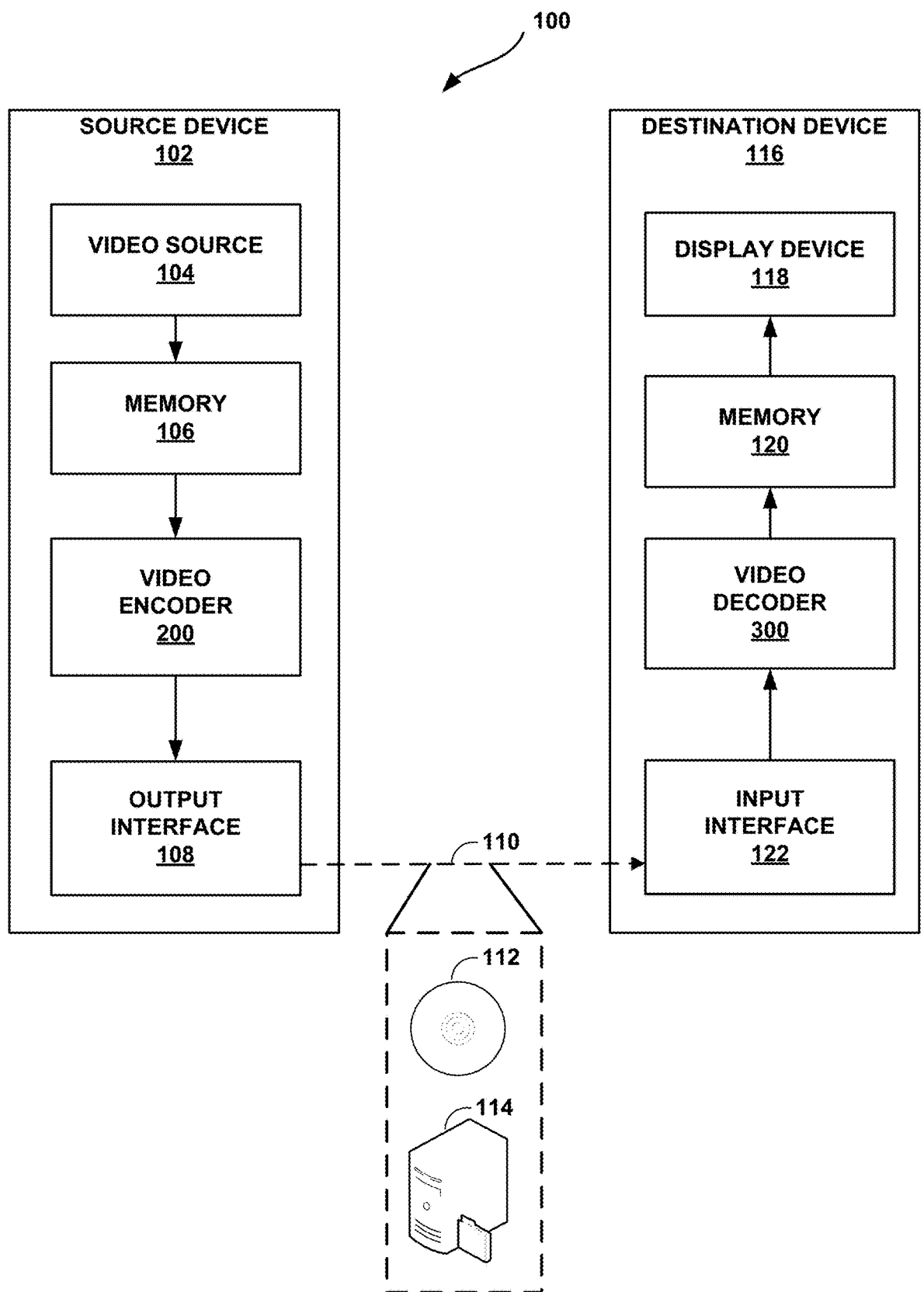
FIG. 1 is a block diagram illustrating an example video encoding and decoding system that may perform the techniques of this disclosure.

In video coding, a video coder (e.g., a video encoder or a video decoder) may code (e.g., encode or decode) a current block of a current picture. As part of the process to code the current block, the video coder may use intra prediction to generate a predictive block for the current block. To generate the predictive block using intra prediction, the video coder may determine values of samples of the predictive block based on a set of reference samples. The set of reference samples may include samples of the current picture that are in a column left of the current block and samples of the current picture that are in a row above the current block. The video coder may use the reference samples to determine the values of the samples of the predictive block in different ways depending on an intra prediction mode of the predictive block.

Prior to determining the values of the samples of the predictive block based on the set of reference samples, the video coder may apply a filter to the reference samples. Applying the filter to the reference samples may improve compression efficiency. Multiple techniques have been developed for applying various types of filters to the reference samples. For example, Mode Dependent Intra Smoothing (MDIS) is one technique for applying filters to the reference samples. In MDIS, the video coder may determine whether to apply any filters to the reference samples depending on the intra prediction mode and the size of the predictive block. Additionally, if the video coder makes the determination to apply a filter to the reference pictures, the video coder may apply different filters to the reference samples depending on the intra prediction mode and the size of the predictive block. The video coder may store both the original unfiltered reference samples (e.g., for the purpose of outputting the reference samples or reuse in prediction of other blocks) and may need to store the filtered reference samples.

In addition to applying a filter to the reference samples as part of performing MDIS, the video coder may apply an interpolation filter to the reference samples. The video coder applies the interpolation filter to integer reference samples to determine values of reference samples between the integer reference samples. The integer reference samples are reference samples at integer-valued coordinates within the current picture. The video coder may use the interpolated reference samples to determine values of samples in the predictive block. When applying an interpolation filter, the video coder may apply a set of weights to the integer reference samples. There may be different weights for different sub-integer positions. For instance, in examples where there are 31 distinct positions between individual integer reference samples, there may be 32 different sets of weights: 31 sets of weights for the positions between individual reference samples and 1 for the integer reference sample. Thus, the video coder may need to store all 32 different sets of weights. Moreover, the video coder may be configured to apply different types of interpolation filters in different circumstances. For instance, the video coder may be configured to apply a cubic interpolation filter in some circumstances and a Gaussian interpolation filter in other circumstances. Thus, the video coder may also need to store sets of weights for each of these types of interpolation filters. Like the filter applied as part of performing MDIS, the Gaussian interpolation filter may provide a smoothing effect. Thus, the video coder in effect may apply two smoothing filter operations consecutively. A smoothing filter is a low-pass filter that passes signals which are lower than a cutoff frequency. A non-smoothing filter is an all-pass filter or a filter with a cutoff frequency cutoff that is higher than the cutoff frequency of the smoothing filter.

Storage of the sets of weights and storage of both filtered and unfiltered reference samples may consume valuable storage space. Moreover, application of two smoothing filter operations consecutively may increase the complexity of the coding process, which may increase the cost of building circuitry to implement the coding process.

This disclosure describes techniques that may reduce the storage requirements and/or may reduce the complexity of the coding process. For example, as described herein, a video coder may implement a process in which the smoothing filter operations of MDIS and Gaussian interpolation filtering are unified for purposes of directional intra prediction modes. As described herein, this may be accomplished by using the same conditions for selecting filters in both MDIS and Gaussian interpolation filtering. Thus, in one example, a video coder may be configured to determine whether a condition is true for a block of a current picture of the video data. Based on the condition being true for the block, the video coder may apply a non-smoothing interpolation filter to unfiltered reference samples of the block to generate predictive samples of the block. However, based on the condition being false for the block, the video coder may apply a smoothing interpolation filter to the unfiltered reference samples of the block to generate the predictive samples of the block. Thus, rather than applying separate MDIS filters and interpolation filters, with the accompanying need for storage of the MDIS filtered samples, the video coder may apply the filters to unfiltered reference samples.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as syntax data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, mobile devices, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for merging MDIS and Gaussian interpolation filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform the techniques of this disclosure for merging MDIS and Gaussian interpolation filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or Versatile Video Coding (VVC) standard presently under development. The techniques of this disclosure, however, are not limited to any particular coding standard.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including 'its Scalable Video Coding (SVC) and Multiview Video Coding (MVC) extensions and ITU-T H.265 (also known as ISO/IEC MPEG-4 HEVC) with its extensions. During the April 2018 meeting of the Joint Video Experts Team (WET), the Versatile Video Coding standardization activity (also known as ITU-T H.266) was kicked off with the evaluation of the video compression technologies submitted to the Call for Proposals. Video encoder 200 and video decoder 300 may operate in accordance with a H.266 video coding standard, or another codec.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Figure 2:
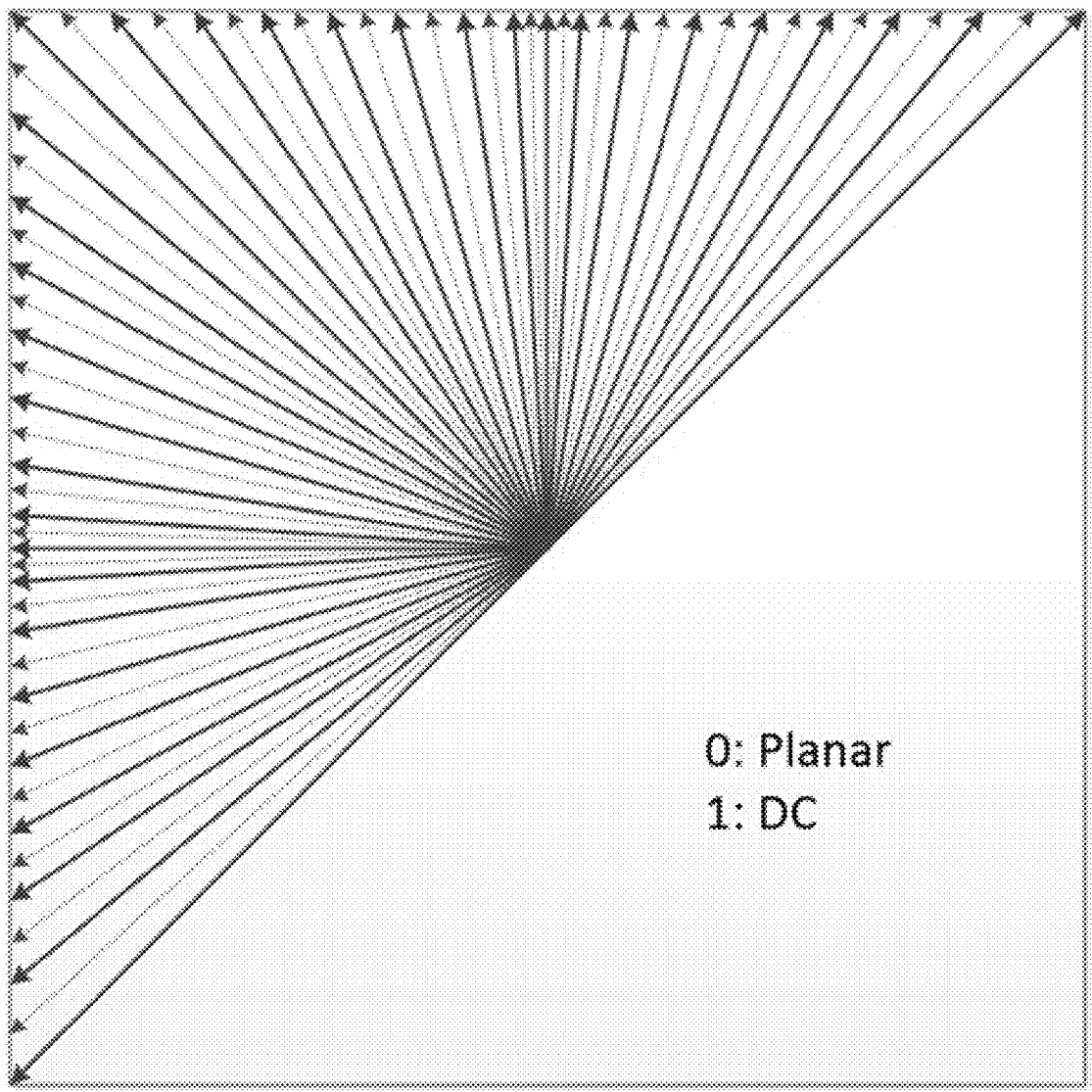
FIG. 2 is a conceptual diagram illustrating an example of intra prediction modes.

FIG. 2 is a conceptual diagram illustrating an example of intra prediction modes. In JEM 7 (J. Chen, E. Alshina et al., "Algorithm description of Joint Exploration Test Model 7," 7$^{th}$ JVET Meeting, Torino, Italy, July 2017, JVET-G1001, hereinafter, "JEM 7"), there are 67 modes for the intra prediction of a luma block, including a planar mode (i.e., a planar intra prediction mode), a DC mode and 65 angular modes (i.e., angular intra prediction modes), as indicated in FIG. 2.

Figure 3:
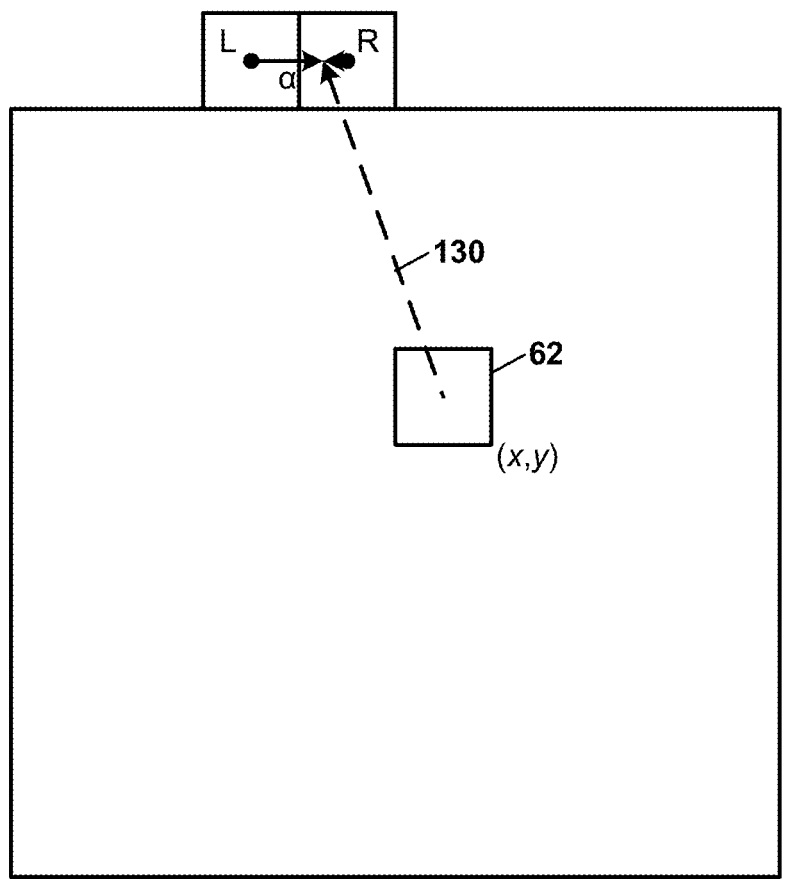
FIG. 3 is a conceptual diagram illustrating an example technique for generating a prediction sample for a block of video data according to an angular intra prediction mode.

FIG. 3 is a conceptual diagram illustrating an example technique for generating a prediction sample for a block of video data according to an angular intra prediction mode. For instance, in the example of FIG. 3, video encoder 200 may determine a fractional position a between neighboring samples L and R, which are two reconstructed samples that neighbor the current PU. Video encoder 200 may determine the fractional position by projecting, along a prediction direction associated with the selected intra prediction mode, a coordinate of the respective sample to a row or column of neighboring reconstructed samples containing the two neighboring reconstructed samples. For instance, in the example of FIG. 3, line 130 shows the prediction direction associated with the selected intra prediction mode and (x,y)

is the coordinate of the respective sample 62. In this example, video encoder 200 may calculate a prediction value of the respective sample using an interpolation filter that uses values of the two neighboring reconstructed samples to interpolate a value at the determined fractional position. In some examples, the video encoder 200 may use the values of one or more neighboring reconstructed samples in addition to the two neighboring reconstructed samples shown in the example of FIG. 3. This interpolation may be in 1/32 pel accuracy. Additionally, in this example, as part of encoding the block of video data, video encoder 200 may generate residual data that represents pixel differences between the current block and the predictive block. Video encoder 200 may transform and quantize the residual data and include, in a bitstream, entropy encoded syntax elements representing the resulting quantized transform coefficients. Video decoder 300 may generate a prediction sample in the same way.

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In HEVC, before intra prediction, the neighboring reference samples are potentially filtered using a 2-tap linear or 3-tap (1,2,1)/4 filter. A tap of a filter is an input value, such as a sample value, used by the filter to determine an output value. The nomenclature (x,y,z)/a indicates that a first tap has a weight x, the second tap has a weight y, and a third tap has a weight z, and a total of the weights multiplied by the respective taps, divided by a is the filtered value assigned to the second tap. This process is known as intra reference smoothing, or MDIS. In MDIS, given the intra prediction mode index (predModeIntra) and block size (nTbS), a video coder (e.g., a video encoder or video decoder) decides whether the reference smoothing process is to be performed and, if so, which smoothing filter is used. The following text is the related paragraph from the HEVC specification:

8.4.4.2.3 Filtering Process of Neighbouring Samples
Inputs to this process are:
the neighbouring samples p[x][y], with x=−1, y=−1 . . . nTbS*2−1 and x=0 . . . nTbS*2−1, y=−1,
a variable nTbS specifying the transform block size.
Outputs of this process are the filtered samples pF[x][y], with x=−1, y=−1 . . . nTbS*2−1 and x=0 . . . nTbS*2−1, y=−1.
The variable filterFlag is derived as follows:
If one or more of the following conditions are true, filterFlag is set equal to 0:
predModeIntra is equal to INTRA_DC.
nTbS is equal 4.
Otherwise, the following applies:
The variable minDistVerHor is set equal to Min(Abs(predModeIntra−26), Abs(predModeIntra−10)).
The variable intraHorVerDistThres[nTbS] is specified in Table 8-3.
The variable filterFlag is derived as follows:
If minDistVerHor is greater than intraHorVerDistThres[nTbS], filterFlag is set equal to 1.
Otherwise, filterFlag is set equal to 0.

TABLE 8-3

Specification of intraHorVerDistThres[nTbS] for various transform block sizes

|  | nTbS = 8 | nTbS = 16 | nTbS = 32 |
|---|---|---|---|
| intraHorVerDistThres[nTbS] | 7 | 1 | 0 |

When filterFlag is equal to 1, the following applies:
The variable biIntFlag is derived as follows:
If all of the following conditions are true, biIntFlag is set equal to 1:
strong_intra_smoothing_enabled_flag is equal to 1
nTbS is equal to 32
Abs(p[−1][−1]+p[nTbS*2−1][−1]−2*p[nTbS−1][−1])<(1<<(BitDepth$_Y$−5))
Abs(p[−1][−1]+p[−1][nTbS*2−1]−2*p[−1][nTbS−1])<(1<<(BitDepth$_Y$−5))
Otherwise, biIntFlag is set equal to 0.
The filtering is performed as follows:
If biIntFlag is equal to 1, the filtered sample values pF[x][y] with x=−1, y=−1 . . . 63 and x=0 . . . 63, y=−1 are derived as follows:

$$pF[-1][-1]=p[-1][-1] \qquad (8\text{-}30)$$

$$pF[-1][y]=((63-y)*p[-1][-1]+(y+1)*p[-1][63]+32)\\ >>6 \text{ for } y=0\ldots 62 \qquad (8\text{-}31)$$

$$pF[-1][63]=p[-1][63] \qquad (8\text{-}32)$$

$$pF[x][-1]=((63-x)*p[-1][-1]+(x+1)*p[63][-1]+32)\\ >>6 \text{ for } x=0\ldots 62 \qquad (8\text{-}33)$$

$$pF[63][-1]=p[63][-1] \qquad (8\text{-}34)$$

Otherwise (biIntFlag is equal to 0), the filtered sample values pF[x][y] with x=−1, y=−1 . . . nTbS*2−1 and x=0 . . . nTbS*2−1, y=−1 are derived as follows:

$$pF[-1][-1]=(p[-1][0]+2*p[-1][-1]+p[0][-1]+2)>>2 \qquad (8\text{-}35)$$

$$pF[-1][y]=(p[-1][y+1]+2*p[-1][y]+p[-1][y-1]+2)\\ >>2 \text{ for } y=0\ldots nTbS*2-2 \qquad (8\text{-}36)$$

$$pF[-1][nTbS*2-1]=p[-1][nTbS*2-1] \qquad (8\text{-}37)$$

$$pF[x][-1]=(p[x-1][-1]+2*p[x][-1]+p[x+1][-1]+2)\\ >>2 \text{ for } x=0\ldots nTbS*2-2 \qquad (8\text{-}38)$$

$$pF[nTbS*2-1][-1]=p[nTbS*2-1][-1] \qquad (8\text{-}39)\text{''}$$

During the Joint Video Exploration Team (WET) activities, the JEM 7 was defined and the following version of an MDIS table was included for luma blocks.

TABLE 1

| sizeIndex | Threshold[sizeIndex] |
|---|---|
| 0 | 20 |
| 1 | 20 |
| 2 | 14 |
| 3 | 2 |
| 4 | 0 |
| 5 | 20 |
| 6 | 0 |

Additionally, a block size index is defined as follows in JEM7:

$$\text{sizeIndex}=(\log 2(\text{BlockWidth})-2+\log 2(\text{BlockHeight})-2)/2+2-1 \qquad (1)$$

In equation (1), BlockWidth is a width of the block, BlockHeight is a height of the block, and log 2(.) is the log base 2 function.

Whether to apply the [1 2 1]/4 smoothing filter to the intra reference samples is determined as follows:

$$\text{IntraModeDiff}=\min(\text{abs}(\text{IntraModeIdx}-HOR\_IDX),\\ \text{abs}(\text{IntraModeIdx}-VER\_IDX)) \qquad (2)$$

In equation (2) above, HOR_IDX is an index for a horizontal intra prediction mode and VER_IDX is an index for a vertical intra prediction mode. HOR_IDX is equal to 18 and VER_IDX is equal to 50 because JEM 7 has 65 directional intra modes (IntraModeIdx 2-66) in addition to planar (IntraModeIdx=0) and DC (IntraModeIdx=1) modes. The 65 directional intra prediction modes have values of IntraModeIdx in a range of 2-66. IntraModeIdx is equal to 0 for the planar intra prediction mode is 0. IntraModeIdx is equal to 1 for the DC intra prediction mode.

The following condition determines whether to apply the smoothing filter:

$$\text{IF IntraModeDiff}>\text{Threshold}[\text{sizeIndex}] \text{ THEN}\\ \text{"apply smoothing filter"} \qquad (3)$$

In equation (3), the video coder uses equation (1) to determine the value of sizeIndex and uses the MDIS table of Table 1 to determine that value of Threshold[sizeIndex].

In J. Chen, E. Alshina, "Algorithm description for Versatile Video Coding and Test Model 1 (VTM1)," 10th JVET Meeting, San Diego, USA, April 2018, JVET-J1002, hereinafter, "VTM1") and Benchmark Model version 1 ("BMS1"), the following MDIS table is included:

TABLE 2

| sizeIndex | Threshold[sizeIndex] |
|---|---|
| 0 | 20 |
| 1 | 20 |

TABLE 2-continued

| sizeIndex | Threshold[sizeIndex] |
|---|---|
| 2 | 20 |
| 3 | 14 |
| 4 | 2 |
| 5 | 0 |
| 6 | 20 or 0 |
| 7 | 0 |

In VTM1 and BMS1, the block size index is defined as follows:

$$\text{sizeIndex} = (\log 2(\text{BlockWidth}) + \log 2(\text{BlockHeight}))/2 \quad (4)$$

Furthermore, in VTM1 and BMS1, whether to apply the [1 2 1]/4 smoothing filter to the intra reference samples is determined as follows:

$$\text{IntraModeDiff} = \min(\text{abs}(\text{IntraModeIdx} - \text{HOR\_IDX}), \text{abs}(\text{IntraModeIdx} - \text{VER\_IDX})) \quad (5)$$

In equation (5) above, HOR_IDX is an index for a horizontal intra prediction mode and VER_IDX is an index for a vertical intra prediction mode. In VTM1 and BMS1, HOR_IDX is equal to 18 and VER_IDX is equal to 50 because VTM1 and BMS1 have 65 directional intra modes in addition to a planar intra prediction mode and a DC intra prediction mode (IntraModeIdx=1) modes. The 65 directional intra prediction modes have values of IntraModeIdx in a range of 2-66. IntraModeIdx is equal to 0 for the planar intra prediction mode is 0. IntraModeIdx is equal to 1 for the DC intra prediction mode.

$$\text{IF IntraModeDiff} > \text{Threshold[sizeIndex] THEN "apply smoothing filter"} \quad (6)$$

The conditions expressed in equations (3) and (6) may be referred to as MDIS conditions because these conditions may control whether the smoothing filter is applied to the reference samples. In JEM 7, VTM1 and BMS1, if the smoothing filter is applied to the reference samples, the video coder applies the smoothing filter to the reference samples before the video coder applies an interpolation filter to the reference samples to determine values for sub-pixel locations between reference samples.

In HEVC, a two-tap linear interpolation filter is used to generate the intra prediction block in the directional prediction modes (i.e., intra prediction modes excluding the planar and DC intra prediction modes). In JEM 7 (J. Chen, E. Alshina et al., "Algorithm description of Joint Exploration Test Model 7," 7$^{th}$ JVET Meeting, Torino, Italy, July 2017, JVET-G1001, hereinafter, "JEM 7") and J. Chen, E. Alshina, "Algorithm description for Versatile Video Coding and Test Model 1 (VTM1)," 10$^{th}$ JVET Meeting, San Diego, USA, April 2018, JVET-J1002, hereinafter, "BMS1" or VTM1), four-tap intra interpolation filters are used for directional intra prediction filtering. Two types of four-tap interpolation filters are used:
- 4-tap cubic interpolation filters for block width smaller than or equal to 8 samples for vertical directional prediction modes (IntraModeIdx>=DIA_IDX(=34)). DIA_IDX denotes an index for an intra prediction mode having an intra prediction mode index of 34.
- 4-tap cubic interpolation filters for block height smaller than or equal to 8 samples for horizontal directional prediction modes (IntraModeIdx<DIA_IDX(=34))
- 4-tap Gaussian interpolation filters for block width greater than 8 samples for vertical directional prediction modes (IntraModeIdx>=DIA_IDX(=34))
- 4-tap Gaussian interpolation filters for block height greater than 8 samples for horizontal directional prediction modes (IntraModeIdx<DIA_IDX(=34))

A phase of an interpolation filter may refer to the number of positions relative to an integer position that may be determined using the interpolation filter. The following 4-tap cubic (32-phase) interpolation filter is employed in JEM7 and BMS1:

intraCubic4TapFilter32[32][4]={
{0, 256, 0, 0}, // 0 Integer-Pel
{-3, 252, 8, -1}, // 1
{-5, 247, 17, -3}, // 2
{-7, 242, 25, -4}, // 3
{-9, 236, 34, -5}, // 4
{-10, 230, 43, -7}, // 5
{-12, 224, 52, -8}, // 6
{-13, 217, 61, -9}, // 7
{-14, 210, 70, -10}, // 8
{-15, 203, 79, -11}, // 9
{-16, 195, 89, -12}, // 10
{-16, 187, 98, -13}, // 11
{-16, 179, 107, -14}, // 12
{-16, 170, 116, -14}, // 13
{-17, 162, 126, -15}, // 14
{-16, 153, 135, -16}, // 15
{-16, 144, 144, -16}, // 16 Half-Pel
{-16, 135, 153, -16}, // 17
{-15, 126, 162, -17}, // 18
{-14, 116, 170, -16}, // 19
{-14, 107, 179, -16}, // 20
{-13, 98, 187, -16}, // 21
{-12, 89, 195, -16}, // 22
{-11, 79, 203, -15}, // 23
{-10, 70, 210, -14}, // 24
{-9, 61, 217, -13}, // 25
{-8, 52, 224, -12}, // 26
{-7, 43, 230, -10}, // 27
{-5, 34, 236, -9}, // 28
{-4, 25, 242, -7}, // 29
{-3, 17, 247, -5}, // 30
{-1, 8, 252, -3}, // 31
};

The following 4-tap Gaussian filter (32-phase) is employed in JEM 7 and BMS1:

intraGauss4TapFilter32[32][4]={
{47, 161, 47, 1}, // 0 Integer-Pel
{43, 161, 51, 1}, // 1
{40, 160, 54, 2}, // 2
{37, 159, 58, 2}, // 3
{34, 158, 62, 2}, // 4
{31, 156, 67, 2}, // 5
{28, 154, 71, 3}, // 6
{26, 151, 76, 3}, // 7
{23, 149, 80, 4}, // 8
{21, 146, 85, 4}, // 9
{19, 142, 90, 5}, // 10
{17, 139, 94, 6}, // 11
{16, 135, 99, 6}, // 12
{14, 131, 104, 7}, // 13
{13, 127, 108, 8}, // 14
{11, 123, 113, 9}, // 15
{10, 118, 118, 10}, // 16 Half-Pel
{9, 113, 123, 11}, // 17
{8, 108, 127, 13}, // 18
{7, 104, 131, 14}, // 19
{6, 99, 135, 16}, // 20
{6, 94, 139, 17}, // 21

{5, 90, 142, 19}, // 22
{4, 85, 146, 21}, // 23
{4, 80, 149, 23}, // 24
{3, 76, 151, 26}, // 25
{3, 71, 154, 28}, // 26
{2, 67, 156, 31}, // 27
{2, 62, 158, 34}, // 28
{2, 58, 159, 37}, // 29
{2, 54, 160, 40}, // 30
{1, 51, 161, 43}, // 31
};

The Gaussian interpolation filter can be derived with the following example Matlab code. In this example, the smoothing strength sigma is set to 0.9:

TABLE 3

```
for i=0:16
    for c=0:3
        filterGaussian(i+1,c+1) = exp(-((c-1-i/32)/sigma)^2);
    end
end
```

In Table 3, exp(.) denotes the exponential function and sigma denotes a standard deviation In another example, the following 6-tap interpolation filter (64-phase) can be used instead of a 4-tap interpolation filter:
intraCubic6TapFilter64[64][6]={
    {0, 0, 256, 0, 0, 0,}, // 0
    {0, -2, 255, 4, -1, 0,}, // 1
    {0, -4, 254, 8, -2, 0,}, // 2
    {1, -6, 252, 12, -3, 0,}, // 3
    {1, -7, 249, 16, -4, 1,}, // 4
    {1, -9, 247, 21, -5, 1,}, // 5
    {1, -11, 245, 26, -6, 1,}, // 6
    {1, -12, 243, 30, -7, 1,}, // 7
    {1, -13, 241, 34, -8, 1,}, // 8
    {2, -15, 238, 39, -9, 1,}, // 9
    {2, -16, 235, 44, -10, 1,}, // 10
    {2, -17, 232, 49, -11, 1,}, // 11
    {2, -18, 229, 53, -12, 2,}, // 12
    {2, -19, 226, 58, -13, 2,}, // 13
    {2, -20, 223, 63, -14, 2,}, // 14
    {2, -21, 220, 67, -14, 2,}, // 15
    {2, -22, 217, 72, -15, 2,}, // 16
    {2, -22, 213, 77, -16, 2,}, // 17
    {3, -23, 209, 82, -17, 2,}, // 18
    {3, -24, 206, 87, -18, 2,}, // 19
    {3, -24, 202, 92, -19, 2,}, // 20
    {3, -24, 198, 97, -20, 2,}, // 21
    {3, -25, 194, 102, -21, 3,}, // 22
    {3, -25, 190, 106, -21, 3,}, // 23
    {3, -25, 186, 111, -22, 3,}, // 24
    {3, -25, 181, 116, -22, 3,}, // 25
    {3, -25, 177, 121, -23, 3,}, // 26
    {3, -26, 173, 126, -23, 3,}, // 27
    {3, -26, 169, 131, -24, 3,}, // 28
    {3, -26, 164, 136, -24, 3,}, // 29
    {3, -25, 159, 140, -24, 3,}, // 30
    {3, -25, 155, 145, -25, 3,}, // 31
    {3, -25, 150, 150, -25, 3,}, // 32
    {3, -25, 145, 155, -25, 3,}, // 33
    {3, -24, 140, 159, -25, 3,}, // 34
    {3, -24, 136, 164, -26, 3,}, // 35
    {3, -24, 131, 169, -26, 3,}, // 36
    {3, -23, 126, 173, -26, 3,}, // 37
    {3, -23, 121, 177, -25, 3,}, // 38
    {3, -22, 116, 181, -25, 3,}, // 39
    {3, -22, 111, 186, -25, 3,}, // 40
    {3, -21, 106, 190, -25, 3,}, // 41
    {3, -21, 102, 194, -25, 3,}, // 42
    {2, -20, 97, 198, -24, 3,}, // 43
    {2, -19, 92, 202, -24, 3,}, // 44
    {2, -18, 87, 206, -24, 3,}, // 45
    {2, -17, 82, 209, -23, 3,}, // 46
    {2, -16, 77, 213, -22, 2,}, // 47
    {2, -15, 72, 217, -22, 2,}, // 48
    {2, -14, 67, 220, -21, 2,}, // 49
    {2, -14, 63, 223, -20, 2,}, // 50
    {2, -13, 58, 226, -19, 2,}, //51
    {2, -12, 53, 229, -18, 2,}, // 52
    {1, -11, 49, 232, -17, 2,}, // 53
    {1, -10, 44, 235, -16, 2,}, // 54
    {1, -9, 39, 238, -15, 2,}, // 55
    {1, -8, 34, 241, -13, 1,}, // 56
    {1, -7, 30, 243, -12, 1,}, // 57
    {1, -6, 26, 245, -11, 1,}, // 58
    {1, -5, 21, 247, -9, 1,}, // 59
    {1, -4, 16, 249, -7, 1,}, // 60
    {0, -3, 12, 252, -6, 1,}, // 61
    {0, -2, 8, 254, -4, 0,}, // 62
    {0, -1, 4, 255, -2, 0,}, // 63
};

In another example, the following 6-tap cubic interpolation filter can be used (32-phase):
intraCubic6TapFilter32[32][6]={
    {0, 0, 256, 0, 0, 0}, // 0
    {0, -4, 253, 9, -2, 0}, // 1
    {1, -7, 249, 17, -4, 0}, // 2
    {1, -10, 245, 25, -6, 1}, // 3
    {1, -13, 241, 34, -8, 1}, // 4
    {2, -16, 235, 44, -10, 1}, // 5
    {2, -18, 229, 53, -12, 2}, // 6
    {2, -20, 223, 63, -14, 2}, // 7
    {2, -22, 217, 72, -15, 2}, // 8
    {3, -23, 209, 82, -17, 2}, // 9
    {3, -24, 202, 92, -19, 2}, // 10
    {3, -25, 194, 101, -20, 3}, // 11
    {3, -25, 185, 111, -21, 3}, // 12
    {3, -26, 178, 121, -23, 3}, // 13
    {3, -25, 168, 131, -24, 3}, // 14
    {3, -25, 159, 141, -25, 3}, // 15
    {3, -25, 150, 150, -25, 3}, // 16
    {3, -25, 141, 159, -25, 3}, // 17
    {3, -24, 131, 168, -25, 3}, // 18
    {3, -23, 121, 178, -26, 3}, // 19
    {3, -21, 111, 185, -25, 3}, // 20
    {3, -20, 101, 194, -25, 3}, // 21
    {2, -19, 92, 202, -24, 3}, // 22
    {2, -17, 82, 209, -23, 3}, // 23
    {2, -15, 72, 217, -22, 2}, // 24
    {2, -14, 63, 223, -20, 2}, // 25
    {2, -12, 53, 229, -18, 2}, // 26
    {1, -10, 44, 235, -16, 2}, // 27
    {1, -8, 34, 241, -13, 1}, // 28
    {1, -6, 25, 245, -10, 1}, // 29
    {0, -4, 17, 249, -7, 1}, // 30
    {0, -2, 9, 253, -4, 0}, // 31
};

The MDIS (Mode Dependent Intra Smoothing) filter, for example [1 2 1]/4, may be applied first to the intra reference samples depending on MDIS conditions. This requires storing unfiltered and filtered lines of intra reference samples for intra prediction. In case of directional intra prediction modes, two interpolation filters (e.g., cubic and Gaussian) may be applied to either the unfiltered or filtered reference samples depending on the separate conditions associated with interpolation filtering. In the case of Gaussian interpolation, where filtering is applied on top of MDIS-filtered reference samples, two smoothing filtering operations are applied consecutively. This means that the complexity is increased and double the storage is required for the unfiltered and filtered intra reference sample lines.

This disclosure proposes merging the two smoothing filtering operations for intra prediction of directional modes: MDIS filtering and Gaussian interpolation filtering. This may be accomplished by applying the MDIS conditions directly to decide between the two interpolation filters and eliminating the separate interpolation filter conditions. This may reduce the amount of storage space required for storage of intra reference sample lines. The techniques of this disclosure may also result in video encoder 200 or video decoder 300 being able to perform intra prediction faster, which decrease video encoding and decoding speeds.

In the Joint Video Experts Team (JVET) and its VVC Test Model version 1 (VTM), VVC Test Model version 2 (VTM2) (J. Chen, Y. Ye, S. Kim, "Algorithm description for Versatile Video Coding and Test Model 2 (VTM2)", $11^{th}$ JVET Meeting, Ljubljana, SI, July 2018, JVET-K1002), Benchmark Model version 1 (BMS 1) software, and Benchmark Model version 2 (BMS2), the following MDIS table is included:

TABLE 4

| sizeIndex | MDISthreshold[sizeIndex] |
|---|---|
| 0 | 20 |
| 1 | 20 |
| 2 | 20 |
| 3 | 14 |
| 4 | 2 |
| 5 | 0 |
| 6 | 20 or 0 |
| 7 | 0 |

The block size index is defined as follows in VTM1, VTM2, BMS1, and BMS2:

$$\text{sizeIndex}=(\log 2(\text{BlockWidth})+\log 2(\text{BlockHeight}))/2 \quad (7)$$

Define the minimum index difference between the directional intra mode and respectively the indices or horizontal and vertical modes:

$$\text{IntraModeDiff}=\min(\text{abs}(\text{IntraModeIdx}-\text{HOR\_IDX}), \text{abs}(\text{IntraModeIdx}-\text{VER\_IDX})) \quad (8)$$

The horizontal mode corresponds to a direction parallel to the top and bottom edges of the picture. The vertical mode corresponds to a direction parallel to the left and right sides of the picture.

A new condition for switching interpolation filters in directional intra prediction is as follows:

TABLE 5

IF (IntraModeDiff> MDISthreshold[sizeIndex])
    THEN "apply cubic interpolation filter"
    ELSE "apply Gaussian interpolation filter"

This way, the Gaussian interpolation filter, which has smoothing properties, is applied as the only smoothing filtering step and only unfiltered reference sample lines need to be stored for directional intra mode prediction. Accordingly, it may be unnecessary for the video coder to store filtered reference samples for use as a basis for interpolation filtering. This may reduce complexity of the video coder.

Accordingly, in this example, the video coder may determine whether a condition (e.g., IntraModeDiff>MDISthreshold[sizeIndex]) is true for a block of a current picture of the video data. Based on the condition being true for the block, the video coder may apply a non-smoothing interpolation filter (e.g., a cubic interpolation filter) to unfiltered reference samples of the block to generate predictive samples of the block. Based on the condition being false for the block, the video coder may apply a smoothing interpolation filter (e.g., a Gaussian interpolation filter) to the unfiltered reference samples of the block to generate the predictive samples of the block.

Note that additional conditions are present in VTM1 and BMS1 to control the smoothing filtering of the intra reference samples, such as dependencies on luma or chroma, usage of the PDPC tool (Position Dependent Intra Prediction combination), usage of NSST (Non-separable Secondary Transform), and so on. Additional conditions may be added to control MDIS.

In some examples, the cubic interpolation filter is the intraCubic6TapFilter32 and the Gaussian filter is a 6-tap filter obtained by the convolution of the [1 2 1]/4 MDIS filter and the intraGauss4TapFilter32 filter resulting in the following intraGauss6TapFilter32:

intraGauss6TapFilter32[32][6]={
  {47, 256, 418, 256, 47, 0}, // 0
  {43, 247, 416, 264, 53, 1}, // 1
  {40, 240, 414, 270, 58, 2}, // 2
  {37, 233, 413, 277, 62, 2}, // 3
  {34, 226, 412, 284, 66, 2}, // 4
  {31, 218, 410, 292, 71, 2}, // 5
  {28, 210, 407, 299, 77, 3}, // 6
  {26, 203, 404, 306, 82, 3}, // 7
  {23, 195, 401, 313, 88, 4}, // 8
  {21, 188, 398, 320, 93, 4}, // 9
  {19, 180, 393, 327, 100, 5}, // 10
  {17, 173, 389, 333, 106, 6}, // 11
  {16, 167, 385, 339, 111, 6}, // 12
  {14, 159, 380, 346, 118, 7}, // 13
  {13, 153, 375, 351, 124, 8}, // 14
  {11, 145, 370, 358, 131, 9}, // 15
  {10, 138, 364, 364, 138, 10}, // 16
  {9, 131, 358, 370, 145, 11}, // 17
  {8, 124, 351, 375, 153, 13}, // 18
  {7, 118, 346, 380, 159, 14}, // 19
  {6, 111, 339, 385, 167, 16}, // 20
  {6, 106, 333, 389, 173, 17}, // 21
  {5, 100, 327, 393, 180, 19}, // 22
  {4, 93, 320, 398, 188, 21}, // 23
  {4, 88, 313, 401, 195, 23}, // 24
  {3, 82, 306, 404, 203, 26}, // 25
  {3, 77, 299, 407, 210, 28}, // 26
  {2, 71, 292, 410, 218, 31}, // 27
  {2, 66, 284, 412, 226, 34}, // 28
  {2, 62, 277, 413, 233, 37}, // 29
  {2, 58, 270, 414, 240, 40}, // 30
  {1, 53, 264, 416, 247, 43}, // 31
};

In another example, the cubic interpolation filter is the intraCubic4TapFilter32 (defined above) and the Gaussian filter is a 4-tap filter with increased smoothing strength obtained with sigma set to 1.3 (see Matlab code above in Table 3) resulting in the following intraGauss4TapFilter32strong:
intraGauss4TapFilter32strong[32][4]={
{65, 116, 64, 11}, or simplified zero-phase: {64, 128, 64, 0}, //0
{61, 116, 67, 12},
{59, 115, 69, 13},
{57, 115, 71, 13},
{55, 114, 73, 14},
{53, 113, 75, 15},
{50, 112, 78, 16},
{47, 111, 80, 18},
{45, 110, 82, 19}, // 8
{43, 109, 84, 20},
{41, 108, 86, 21},
{40, 106, 88, 22},
{37, 105, 90, 24},
{36, 103, 92, 25},
{34, 101, 94, 27},
{32, 100, 96, 28},
{30, 98, 98, 30}, // 16
{28, 96, 100, 32},
{27, 94, 101, 34},
{25, 92, 103, 36},
{24, 90, 105, 37},
{22, 88, 106, 40},
{21, 86, 108, 41},
{20, 84, 109, 43},
{19, 82, 110, 45}, // 24
{18, 80, 111, 47},
{16, 78, 112, 50},
{15, 75, 113, 53},
{14, 73, 114, 55},
{13, 71, 115, 57},
{13, 69, 115, 59},
{12, 67, 116, 61}, // 31
};

In another example, the cubic interpolation filter is the intraCubic4TapFilter32 (defined above) and after reducing the number of bits required for storing the filter coefficients (9 bits/coefficient reduced to 7 bit/coefficient) the filter intraCubic4TapFilter32_7bitcoeff is obtained:
intraCubic4TapFilter32_7bitcoeff[32][4]={
{0, 64, 0, 0}, //zero phase
{-1, 63, 2, 0},
{-1, 62, 4, -1},
{-2, 61, 6, -1},
{-3, 59, 9, -1},
{-3, 58, 11, -2},
{-3, 56, 13, -2},
{-3, 54, 15, -2},
{-4, 53, 18, -3}, // 8
{-4, 51, 20, -3},
{-4, 49, 22, -3},
{-5, 47, 25, -3},
{-4, 45, 27, -4},
{-4, 43, 29, -4},
{-5, 41, 32, -4},
{-4, 38, 34, -4},
{-4, 36, 36, -4}, // 16
{-4, 34, 38, -4},
{-5, 32, 41, -4},
{-4, 29, 43, -4},
{-4, 27, 45, -4},
{-4, 25, 47, -4},
{-3, 22, 49, -4},
{-3, 20, 51, -4},
{-3, 18, 53, -4}, // 24
{-2, 15, 54, -3},
{-2, 13, 56, -3},
{-2, 11, 58, -3},
{-2, 9, 59, -2},
{-1, 6, 61, -2},
{-1, 4, 62, -1},
{0, 2, 63, -1} // 31
};

In yet another example, the Gaussian interpolation filter is the intraGauss4TapFilter32strong (defined above) and after reducing the number of bits required for storing the filter coefficients (7 bits/coefficient reduced to 5 bit/coefficient) the following filter intraGauss4TapFilter32strong_5bitcoeff is obtained:
intraGauss4TapFilter32strong_5bitcoeff[32][4]={
{ 16, 29, 16, 3}, or simplified zero-phase: {16, 32, 16, 0},
{ 15, 29, 17, 3},
{ 15, 29, 17, 3},
{ 14, 29, 18, 3},
{ 13, 29, 18, 4},
{ 13, 28, 19, 4},
{ 13, 28, 19, 4},
{ 12, 28, 20, 4},
{ 11, 28, 20, 5}, // 8
{ 11, 27, 21, 5},
{ 10, 27, 22, 5},
{ 9, 27, 22, 6},
{ 9, 26, 23, 6},
{ 9, 26, 23, 6},
{ 8, 25, 24, 7},
{ 8, 25, 24, 7},
{ 8, 24, 24, 8}, // 16
{ 7, 24, 25, 8},
{ 7, 24, 25, 8},
{ 6, 23, 26, 9},
{ 6, 23, 26, 9},
{ 6, 22, 27, 9},
{ 5, 22, 27, 10},
{ 5, 21, 27, 11},
{ 5, 20, 28, 11}, 24
{ 4, 20, 28, 12},
{ 4, 19, 28, 13},
{ 4, 19, 28, 13},
{ 4, 18, 29, 13},
{ 3, 18, 29, 14},
{ 3, 17, 29, 15},
{ 3, 17, 29, 15} // 31
};

Note that in case integer reference sample locations are computed, the 0-phase of both filters is used.

In the general case, a video coder applies a non-smoothing interpolation filter if the MDIS condition is true and the video coder applies an interpolation filter with smoothing properties if the MDIS condition is false. The number of filter taps may also vary, for example:

4-tap non-smoothing interpolation filter (e.g., intraCubic4TapFilter32 or intraCubic4TapFilter32_7bitcoeff) and 4-tap smoothing interpolation filter (e.g., intraGauss4TapFilter32 or intraGauss4TapFilter32strong or intraGauss4TapFilter32strong_5bitcoeff)

4-tap non-smoothing interpolation filter (e.g., intraCubic4TapFilter32 or intraCubic4TapFilter32_7bitcoeff) and 6-tap smoothing interpolation filter (e.g., intraGauss6TapFilter32)

6-tap non-smoothing interpolation filter (e.g., intraCubic6TapFilter32) and 4-tap smoothing interpolation filter (e.g., intraGauss4TapFilter32 or intraGauss4TapFilter32strong or intraGauss4TapFilter32strong_5bitcoeff) Etc.

In addition, the number of phases of the non-smoothing and smoothing interpolation filters may be identical or different, e.g., 32-phase or 64-phase.

In a further generalization, the MDIS conditions can determine the usage of more than two interpolation filters with different smoothing properties. For example, the smoothing strength may depend on the intra mode, distance from block boundary, block dimensions, etc. For instance, the video coder may select interpolation filters with progressively greater smoothing strengths for determining values of reference samples progressively further from boundaries of the current block. Filters with greater smoothing strength reduce differences between values of samples more than filters with less smoothing strength.

In a further generalization, multiple intra reference lines may be used for prediction and the choice of interpolation filter and its properties may depend on the reference line index. For example, the video coder may select interpolation filter to apply to different reference samples of a current block based on the MDIS conditions and based on the reference line indexes of the reference samples. For instance, in one example, when the MDIS condition is true, the video coder may select a first interpolation filter for determining a value of a reference sample in a first reference line, select a second interpolation filter for determining a value of a reference sample in a second reference line, and so on; when the MDIS condition is false, the video coder may select a third interpolation filter for determining the value of the reference sample in the first reference line, a fourth interpolation filter for determining the value of the reference sample in the second reference line, and so on. Reference line indexes are indexes of rows or columns of reference samples.

In some alternatives, the choice of smoothing filters may be determined, in addition to or in replacement of the MDIS conditions, by checking the property of the interpolation filters used in one or more neighboring blocks. For instance, in one example, the video coder may determine whether the condition is true for the block (and therefore apply the non-smoothing interpolation filter) if the video coder used a non-smoothing interpolation filter with a neighboring block. In this example, the video coder may determine that the condition is false for the block (and therefore apply the smoothing interpolation filter) if the video coder used a smoothing interpolation filter with the neighboring block.

In other alternatives, bidirectional intra prediction coding (prediction from two or more samples from two directions) may be applied, and the choice of interpolation filter and its properties may also depend on whether bidirectional intra prediction is applied and may also depend on the particular modes/directions associated with the bidirectional prediction. For instance, in this example, the video coder may determine that the condition is true when both bidirectional intra prediction is applied for the block and the intra mode difference is greater than a threshold (e.g., a threshold determined using Table 4); and the video coder may determine that the condition is false when either bidirectional intra prediction is not applied or the intra mode difference is not greater than the threshold.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 4A:
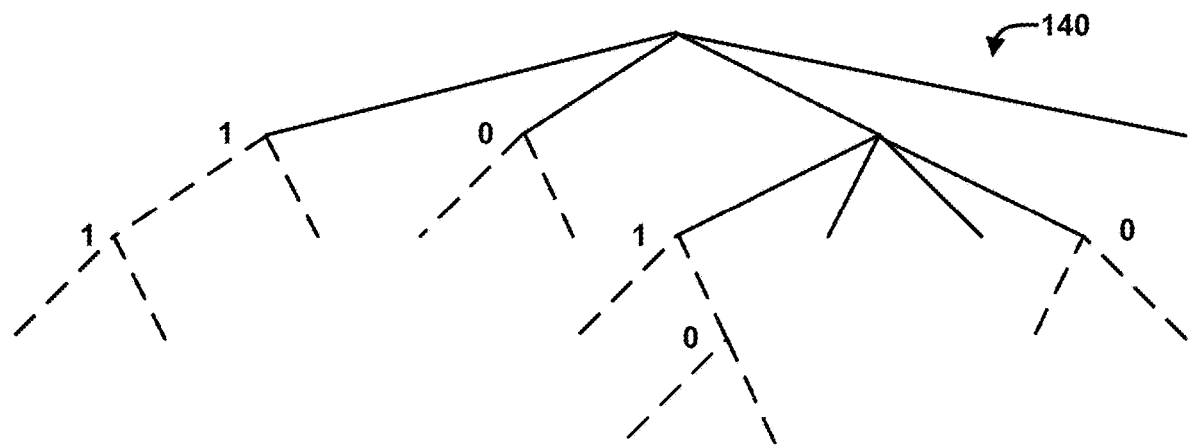
FIGS. 4A and 4B are conceptual diagrams illustrating an example quadtree binary tree (QTBT) structure, and a corresponding coding tree unit (CTU).
Figure 4B:
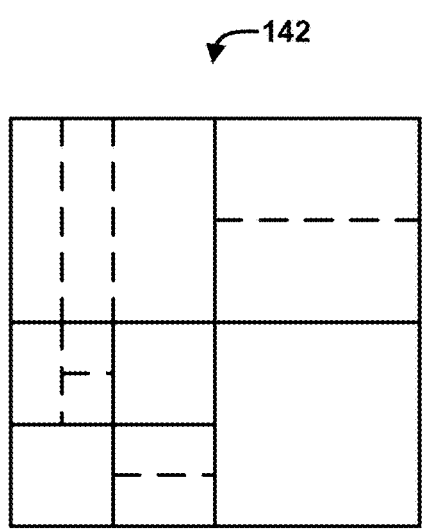

FIGS. 4A and 4B are conceptual diagram illustrating an example QTBT structure 140, and a corresponding coding tree unit (CTU) 142. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 140 (i.e., the solid lines) and syntax elements (such as splitting information) for a prediction tree level of QTBT structure 140 (i.e., the dashed lines). Video encoder 200 may encode, and video decoder 300 may decode, video data, such as prediction and transform data, for CUs represented by terminal leaf nodes of QTBT structure 140.

In general, CTU 142 of FIG. 4B may be associated with parameters defining sizes of blocks corresponding to nodes of QTBT structure 140 at the first and second levels. These parameters may include a CTU size (representing a size of CTU 142 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 140 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 140 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the node is not further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Figure 5:
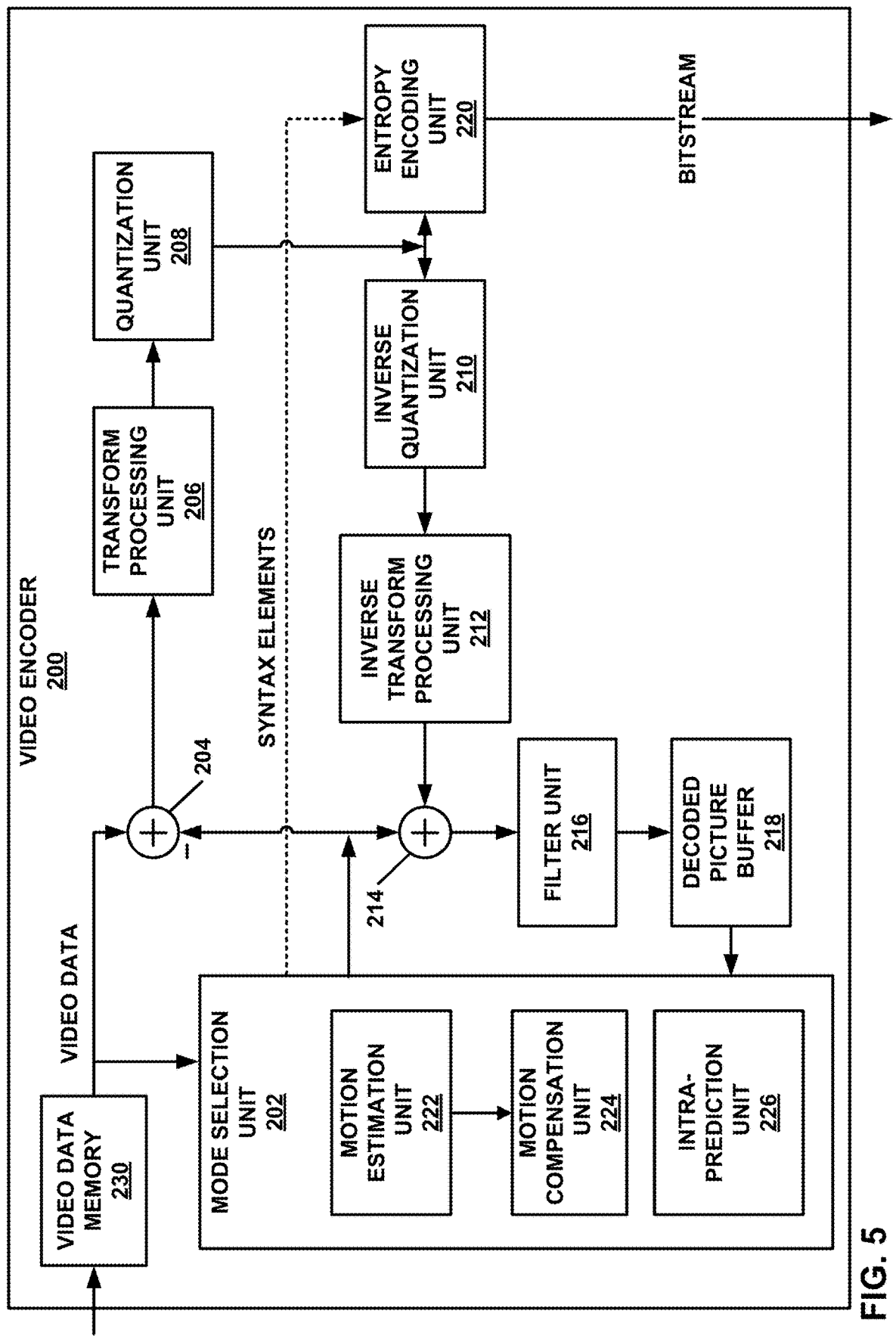
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded. Video encoder 200 may output a bitstream that includes the entropy encoded syntax elements needed to reconstruct blocks of a slice or picture.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to determine whether a condition is true for a first block of a current picture of the video data. Based on the condition being true for the first block, video encoder 200 may apply a non-smoothing interpolation filter to unfiltered reference samples of the first block to generate predictive samples of the first block. Additionally, video encoder 200 may determine whether the condition is true for a second block of the current picture. Based on the condition being false for the second block, video encoder 200 may apply a smoothing interpolation filter to unfiltered reference samples of the second block to generate predictive samples of the second block. Video encoder 200 may generate residual data for the first block based on the predictive samples of the first block. Additionally, video encoder 200 may generate residual data for the second block based on the predictive samples of the second block. Video encoder 200 may include, in a bitstream that includes an encoded representation of the video data, data representing the residual data for the first block and the residual data for the second block. For instance, video encoder 200 may generate the data representing the residual data by applying one or more transforms to the residual data into transform coefficients, quantizing the transform coefficients, entropy encoding syntax elements indicating the quantized transform coefficients, and so on.

In this example, video encoder 200 may determine an intra mode difference for the first block and determine an intra mode difference for the second block. Video encoder 200 may determine whether the condition is true for the first block based at least in part on whether the intra mode difference for the first block is greater than a threshold. Video encoder 200 may determine whether the condition is true for the second block based at least in part on whether the intra mode difference for the second block is less than the threshold. Video encoder 200 may determine the intra mode difference for the first block as a minimum of: (1) an absolute value of a difference between an intra mode index for the first block and an intra mode index of a horizontal intra prediction mode, and (2) an absolute value of a difference between the intra mode index for the first block and an intra mode index of a vertical intra prediction mode. Similarly, video encoder 200 may determine the intra mode difference for the second block as a minimum of: (1) an absolute value of a difference between an intra mode index for the second block and an intra mode index of a horizontal intra prediction mode, and (2) an absolute value of a difference between the intra mode index for the second block and an intra mode index of a vertical intra prediction mode.

Furthermore, in some examples, video encoder 200 may determine, based on one or more additional conditions, whether the condition is true for the first block. Likewise, video encoder 200 may determine, based on the one or more additional conditions, whether the condition is true for the second block. The one or more additional conditions may include one or more of: dependencies on luma or chroma, usage of a position dependent intra prediction combination tool, and usage of a non-separable secondary transform. In some examples, video encoder 200 may determine whether the condition is true for the first block based at least in part on a property of interpolation filters used in one or more neighboring blocks of the first block and may determine whether the condition is true for the second block based at least in part on a property of interpolation filters used in one or more neighboring blocks of the second block. In some examples, video encoder 200 may determine whether the condition is true for the first block based at least in part on whether bidirectional intra prediction coding is applied for the first block and may determine whether the condition is true for the second block based at least in part on whether bidirectional intra prediction coding is applied for the second block.

In some examples, the smoothing interpolation filter is a Gaussian interpolation filter. In some examples, the non-smoothing interpolation filter is a cubic interpolation filter. In some examples, the smoothing interpolation filter and the non-smoothing interpolation filter have a different number of phases. In some examples, the smoothing interpolation filter and the non-smoothing interpolation filter have a different number of taps.

Figure 6:
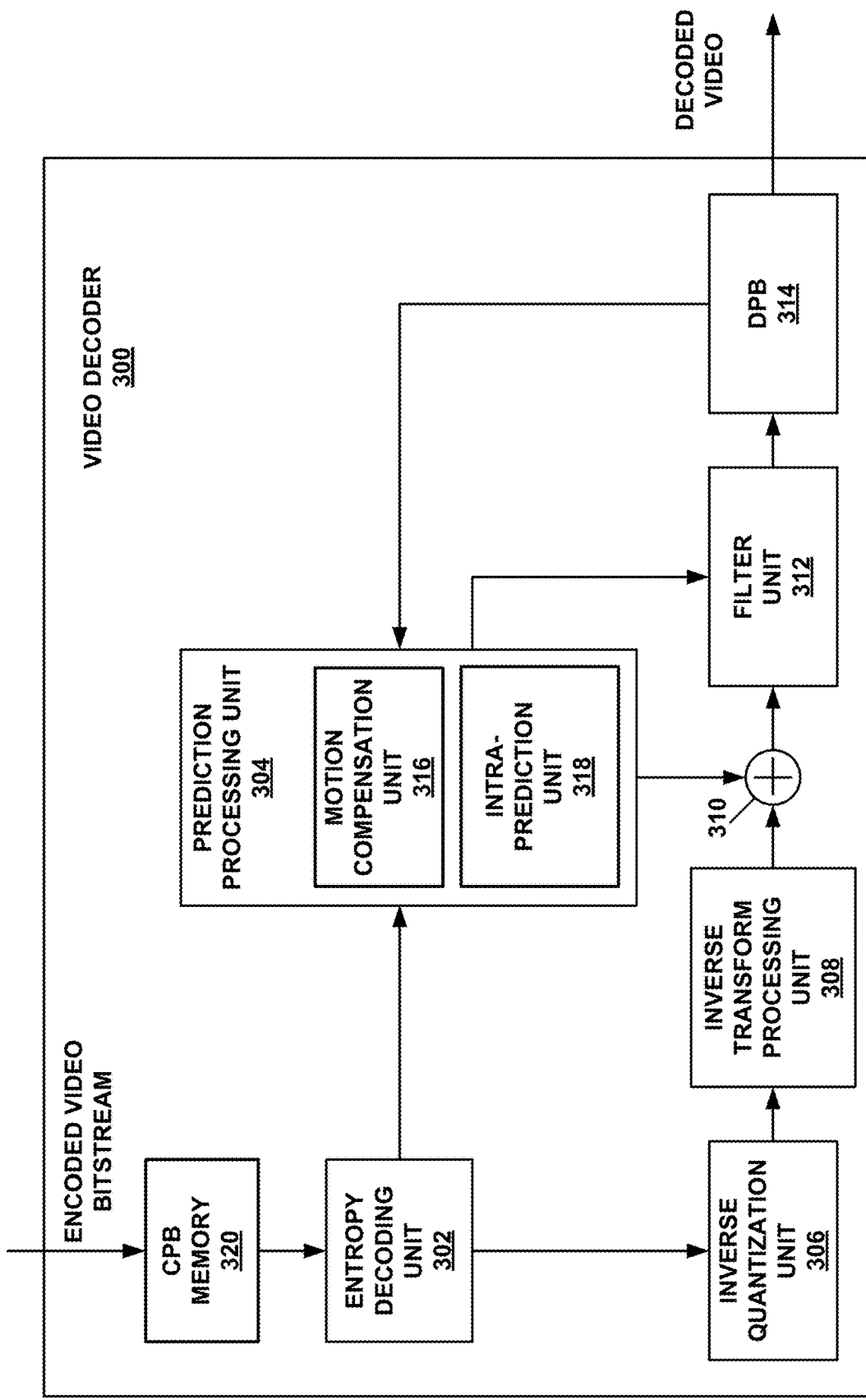
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to determine whether a condition is true for a first block of a current picture of the video data. Based on the condition being true for the first block, video decoder 300 may apply a non-smoothing interpolation filter to unfiltered reference samples of the first block to generate predictive samples of the first block. Furthermore, video decoder 300 may determine whether the condition is true for a second block of the current picture. Based on the condition being false for the second block, video decoder 300 may apply a smoothing interpolation filter to unfiltered reference samples of the second block to generate predictive samples of the second block. Video decoder 300 may reconstruct the first block based on the predictive samples of the first block. Furthermore, video decoder 300 may reconstruct the second block based on the predictive samples of the second block. Video decoder 300 may reconstruct a block based on predictive samples of the block by adding the predictive samples of the block to residual data for the block.

In this example, video decoder 300 may determine an intra mode difference for the first block and determine an intra mode difference for the second block. Video decoder 300 may determine whether the condition is true for the first block based at least in part on whether the intra mode difference for the first block is greater than a threshold. For instance, the condition may be true when the intra mode difference is greater than the threshold and false otherwise. Video decoder 300 may determine whether the condition is true for the second block based at least in part on whether the intra mode difference for the second block is less than the threshold. Video decoder 300 may determine the intra mode difference for the first block as a minimum of: (1) an absolute value of a difference between an intra mode index for the first block and an intra mode index of a horizontal intra prediction mode, and (2) an absolute value of a difference between the intra mode index for the first block and an intra mode index of a vertical intra prediction mode. Similarly, video decoder 300 may determine the intra mode difference for the second block as a minimum of: (1) an absolute value of a difference between an intra mode index for the second block and an intra mode index of a horizontal intra prediction mode, and (2) an absolute value of a difference between the intra mode index for the second block and an intra mode index of a vertical intra prediction mode.

Furthermore, in some examples, video decoder 300 may determine, based on one or more additional conditions, whether the condition is true for the first block. Likewise, video decoder 300 may determine, based on the one or more additional conditions, whether the condition is true for the second block. The one or more additional conditions may include one or more of: dependencies on luma or chroma, usage of a position dependent intra prediction combination tool, and usage of a non-separable secondary transform. In some examples, video decoder 300 may determine whether the condition is true for the first block based at least in part on a property of interpolation filters used in one or more neighboring blocks of the first block and may determine whether the condition is true for the second block based at least in part on a property of interpolation filters used in one or more neighboring blocks of the second block. In some examples, video decoder 300 may determine whether the condition is true for the first block based at least in part on whether bidirectional intra prediction coding is applied for the first block and may determine whether the condition is true for the second block based at least in part on whether bidirectional intra prediction coding is applied for the second block.

In some examples, the smoothing interpolation filter is a Gaussian interpolation filter. In some examples, the non-smoothing interpolation filter is a cubic interpolation filter. In some examples, the smoothing interpolation filter and the non-smoothing interpolation filter have a different number of phases. In some examples, the smoothing interpolation filter and the non-smoothing interpolation filter have a different number of taps.

Figure 7:
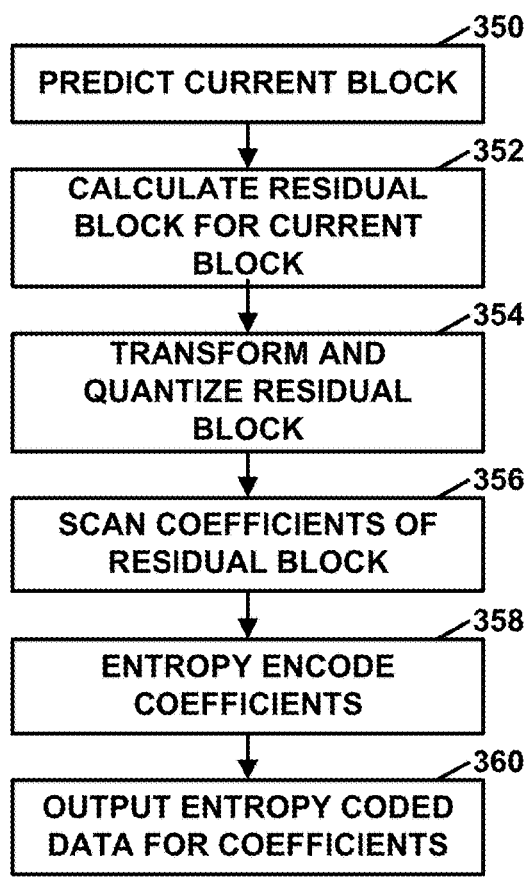
FIG. 7 is a flowchart illustrating an example method for encoding a current block.

FIG. 7 is a flowchart illustrating an example method for encoding a current block. The current block may be a current CU. Although described with respect to video encoder 200 (FIGS. 1 and 5), it should be understood that other devices may be configured to perform a method similar to that of FIG. 7.

In this example, video encoder 200 initially predicts the current block (350). For example, video encoder 200 may form a prediction block for the current block. Video encoder 200 may perform the intra filtering techniques of this disclosure as part of predicting the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 8:
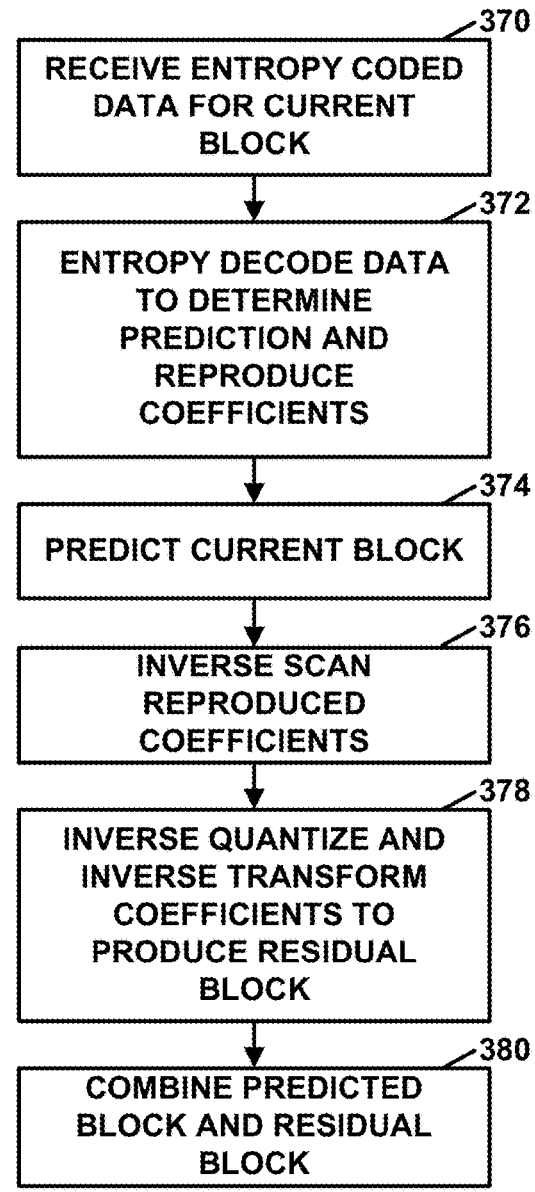
FIG. 8 is a flowchart illustrating an example method for decoding a current block of video data.

FIG. 8 is a flowchart illustrating an example method for decoding a current block of video data. The current block may be a current CU. Although described with respect to video decoder 300 (FIGS. 1 and 6), it should be understood that other devices may be configured to perform a method similar to that of FIG. 8.

Video decoder 300 may receive entropy coded data for the current block, such as entropy coded prediction information and entropy coded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may perform the intra filtering techniques of this disclosure as part of predicting the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 9:
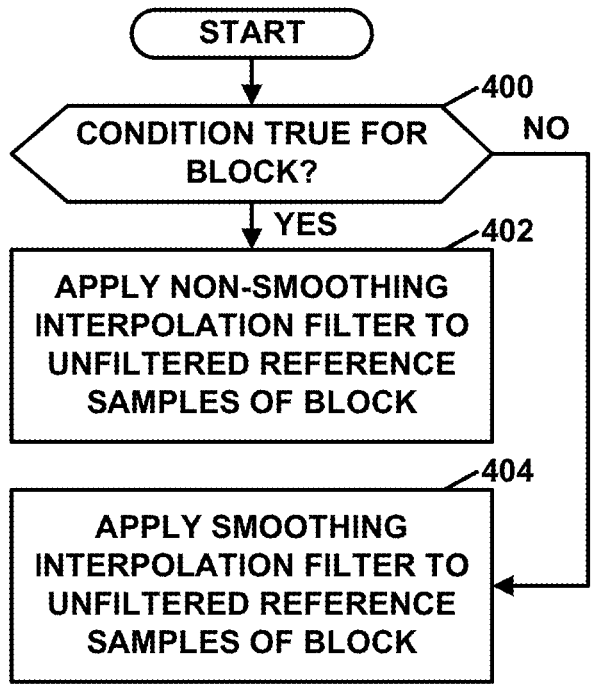
FIG. 9 is a flowchart illustrating an example operation performed by a video coder during an intra prediction process for a block of video data, in accordance with one or more techniques of this disclosure.

FIG. 9 is a flowchart illustrating an example operation performed by a video coder during an intra prediction process for a block of video data, in accordance with one or more techniques of this disclosure. The operation of FIG. 9 may be performed by video encoder 200 or video decoder 300. For instance, in the context of FIG. 5, intra-prediction unit 226 may perform the operation of FIG. 9. In the context of FIG. 6, intra-prediction unit 318 may perform the operation of FIG. 9. In the context of FIG. 7, video encoder 200 may perform the operation of FIG. 9 as part of predicting the block in action 350. In the context of FIG. 8, video decoder 300 may perform the operation of FIG. 9 as part of predicting the block in action 374.

Figure 10:
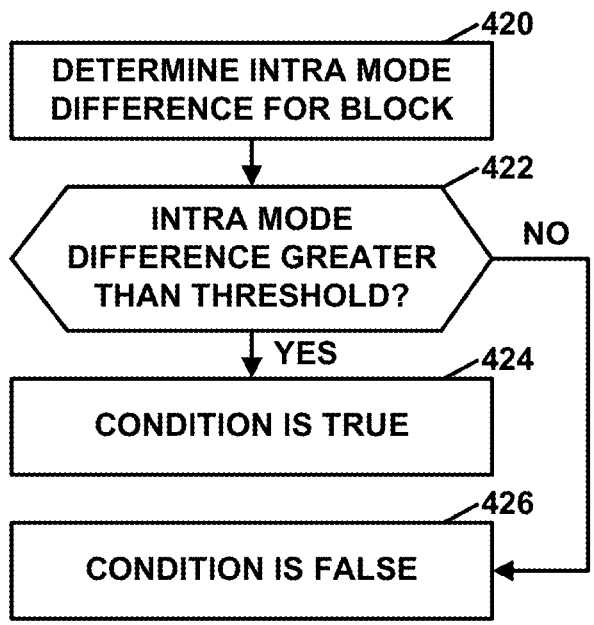
FIG. 10 is a flowchart illustrating an example operation performed by a video coder to determine whether the condition of the operation of FIG. 9 is true, in accordance with one or more techniques of this disclosure.

As shown in the example of FIG. 9, the video coder may determine whether a condition is true for a block of a current picture of the video data (400). The video coder may determine whether the condition is true in one or more of various ways. For instance, FIG. 10 describes an example operation to determine whether the condition is true. FIG. 10 is described in detail elsewhere in this disclosure. In some examples, the condition may be based on properties of interpolation filters used by one or more neighboring blocks, whether bidirectional intra prediction coding is applied, and so on, as described elsewhere in this disclosure.

In the example of FIG. 9, based on the condition being true for the block ("YES" branch of 400), the video coder may apply a non-smoothing interpolation filter to unfiltered reference samples of the block to generate predictive samples of the block (402). For example, the video coder may apply any of the Cubic interpolation filters described elsewhere in this disclosure, or others. Note that the video coder in FIG. 9 applies the non-smoothing interpolation filter to unfiltered reference samples. This is in contrast to JEM 7, in which the video coder may, under some circumstances, apply the non-smoothing interpolation filter to filtered reference samples, e.g., reference samples to which the video coder has already applied an MDIS filter. In accordance with a technique of this disclosure, because there are no circumstances under which the video coder needs to apply the non-smoothing interpolation filter to filtered reference samples, the video coder does not need to store or retrieve the filtered reference samples, which may reduce the complexity of the video coder.

To apply the non-smoothing interpolation filter to the unfiltered reference samples of the block to generate the predictive samples of the block, the video coder may, for each of sample of the block, interpolate a value for a fractional position between two integer reference sample using the non-smoothing interpolation filter, e.g., as described above with respect to FIG. 3. The video coder may then assign the interpolated value to the sample of the block, thereby generating a predictive sample of the block. In examples where the video coder applies bidirectional intra prediction, the block may have two intra prediction modes and the video coder may interpolate two values for each sample of the block based on the two intra prediction modes for the block. The video coder may interpolate each of the values in the same manner as described elsewhere in this disclosure. The video coder may then generate the predictive value for the sample based on the two interpolated values. For instance, the video coder may generate the predictive value for the sample as an average of the two interpolated values.

However, based on the condition being false for the block ("NO" branch of 400), the video coder may apply a smoothing interpolation filter to the unfiltered reference samples of the block to generate the predictive samples of the block (404). For example, the video coder may apply any of the Gaussian interpolation filters described elsewhere in this disclosure, or others. To apply the smoothing interpolation filter to the unfiltered reference samples of the block to generate the predictive samples of the block, the video coder may, for each of sample of the block, interpolate a value for a fractional position between two integer reference sample using the smoothing interpolation filter, e.g., as described above with respect to FIG. 3. The video coder may then assign the interpolated value to the sample of the block, thereby generating a predictive sample of the block.

Note that the video coder in FIG. 9 applies the smoothing interpolation filter to unfiltered reference samples. This is in contrast to JEM 7, in which the video coder may, under some circumstances, apply the smoothing interpolation filter to filtered reference samples, e.g., reference samples to which the video coder has already applied an MDIS filter. In accordance with a technique of this disclosure, because there are no circumstances under which the video coder needs to apply the smoothing interpolation filter to filtered reference samples, the video coder does not need to store or retrieve the filtered reference samples, which may reduce the complexity of the video coder.

In this disclosure, with respect to the condition used to determine whether to apply the non-smoothing interpolation filter or the non-smoothing interpolation filter, "true" may correspond to one Boolean value and "false" may correspond to the other Boolean value. In any of the examples of this disclosure, references to "true" and "false" may be exchanged. For instance, the video coder may apply the non-smoothing interpolation filter in response to determining that the condition is false and may apply the smoothing interpolation filter in response to determining that the condition is true.

Subsequently, in examples where the video coder is video encoder 200, video encoder 200 may generate residual data for the block based on the predictive samples of the first block. In such examples, video encoder 200 may include, in a bitstream that includes an encoded representation of the video data, data representing the residual data for the block. For instance, in the context of FIG. 5, residual generation unit 204 of video encoder 200 may calculate sample-by-sample differences between the block and the prediction block (i.e., the predictive samples of the block). In the context of FIG. 7, video encoder 200 may generate the residual data in action 352. Furthermore, in the context of FIG. 7, video encoder 200 may include the data representing the residual data for the block in the bitstream as part of outputting entropy-encoded data for coefficients in action 360.

In examples where the video coder is video decoder 300, video decoder 300 may reconstruct the block based on the predictive samples of the block. For instance, in the context of FIG. 5, reconstruction unit 310 of video decoder 300 may add samples of a residual block to corresponding samples of the prediction block (i.e., the predictive samples of the block) to reconstruct the block. In the context of FIG. 8, video decoder 300 may reconstruct the block as part of combining the predicted block and residual data in action 380.

The video coder may perform the operation of FIG. 9 for multiple blocks in the current picture. Thus, the video coder may perform the operation of FIG. 9 for a first block of the current picture, a second block of the current picture, and so on. For some blocks of the current picture, the video coder may determine that the condition is true and may determine for other blocks of the current picture that the condition is false. In examples where the video coder is video encoder 200, video encoder 200 may include, in a bitstream that includes an encoded representation of the video data, data representing residual data for a first block and residual data for a second block, and so on.

FIG. 10 is a flowchart illustrating an example operation performed by a video coder to determine whether the condition of the operation of FIG. 9 is true, in accordance with one or more techniques of this disclosure. In the example of FIG. 10, the video coder may determine an intra mode difference for the block. The video coder may determine the intra mode difference for the first block as a minimum of: (1) an absolute value of a difference between an intra mode index for the first block and an intra mode index of a horizontal intra prediction mode, and (2) an absolute value of a difference between the intra mode index for the first block and an intra mode index of a vertical intra prediction mode. That is, the video coder may determine the intra mode difference for the block as set forth in equation (2) and equation (8), above.

In the example of FIG. 10, the video coder may determine whether the condition is true for the block based at least in part on whether the intra mode difference for the block is greater than a threshold (422). For instance, the video coder may determine that the condition is true if the intra mode difference is greater than the threshold, e.g., as described in Table 5. Likewise, the video coder may determine that the condition is false if the intra mode different is not greater than the threshold. Thus, in the example of FIG. 10, in response to determining that the intra mode difference is greater than the threshold ("YES" branch of 422), the video coder may determine that the condition is true (424). Conversely, in response to determining that the intra mode difference is not greater than the threshold ("NO" branch of 422), the video coder may determine that the condition is not true (426). In some examples, the video coder uses equation (7) and Table 4 to determine the threshold.

In some examples, the video coder may determine, based on one or more additional conditions (i.e., conditions in addition to whether the intra mode difference for the block is greater than the threshold), whether the condition is true for the block. For instance, the one or more additional conditions may include one or more of: dependencies on luma or chroma, usage of a position dependent intra prediction combination tool, and usage of a non-separable secondary transform.

In some examples, the video coder may determine whether the condition is true for the block based at least in part on a property of interpolation filters used in one or more neighboring blocks of the block. For instance, in one example, the video coder may determine whether the condition is true for the block (and therefore apply the non-smoothing interpolation filter) if the video coder used a non-smoothing interpolation filter with a neighboring block. In this example, the video coder may determine that the condition is false for the block (and therefore apply the smoothing interpolation filter) if the video coder used a smoothing interpolation filter with the neighboring block.

In some examples, the video coder may determine whether the condition is true for the block based at least in part on whether bidirectional intra prediction coding is applied for the block. For example, the video coder may determine that the condition is true (and, hence, apply the non-smoothing interpolation filter) when both bidirectional intra prediction is applied for the block and the intra mode difference is greater than a threshold (e.g., a threshold determined using Table 4). In this example, the video coder may determine that the condition is false (and hence, apply the smoothing interpolation filter) when either bidirectional intra prediction is not applied or the intra mode difference is not greater than the threshold. For instance, in this example, the video coder may determine that the condition is true when both bidirectional intra prediction is applied for the block and the intra mode difference is greater than a threshold (e.g., a threshold determined using Table 4); and the video coder may determine that the condition is false when either bidirectional intra prediction is not applied or the intra mode difference is not greater than the threshold. In another example, the video coder may determine that the condition is true (and, hence, apply the non-smoothing interpolation filter) when bidirectional intra prediction is not applied for the block and determine that the condition is false (and hence, apply the smoothing interpolation filter) when bidirectional intra prediction is applied.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining an intra mode difference for a block of a current picture of the video data, wherein determining the intra mode difference for the block comprises determining the intra mode difference for the block as a minimum of: (1) an absolute value of a difference between an intra mode index for the block and an intra mode index of a horizontal intra prediction mode, and (2) an absolute value of a difference between the intra mode index for the block and an intra mode index of a vertical intra prediction mode;
   determining, based at least in part on a comparison of the intra mode difference for the block and a threshold, which one of a non-smoothing interpolation filter and a smoothing interpolation filter to apply to unfiltered reference samples of the block;
   based on the determination, applying the non-smoothing interpolation filter or the smoothing interpolation filter to the unfiltered reference samples of the block to generate predictive samples of the block; and
   reconstructing the block based on the predictive samples of the block.

2. The method of claim 1, wherein determining which one of the non-smoothing interpolation filter and the smoothing interpolation filter to apply to the unfiltered reference samples of the block comprises determining, based on the comparison of the intra mode difference for the block and the threshold and based on one or more additional conditions, which one of the non-smoothing interpolation filter and the smoothing interpolation filter to apply to the unfiltered reference samples of the block.

3. The method of claim 2, wherein the one or more additional conditions include one or more of: dependencies on luma or chroma, usage of a position dependent intra prediction combination tool, or usage of a non-separable secondary transform.

4. The method of claim 1, wherein:
   determining which one of the non-smoothing interpolation filter and the smoothing interpolation filter to apply to the unfiltered reference samples of the block comprises determining based on the comparison of the intra mode difference for the block and the threshold and based on a property of interpolation filters used in one or more neighboring blocks of the block, which one of the non-smoothing interpolation filter and the smoothing interpolation filter to apply to the unfiltered reference samples of the block.

5. The method of claim 1, wherein:
   determining which one of the non-smoothing interpolation filter and the smoothing interpolation filter to apply to the unfiltered reference samples of the block comprises determining based on the comparison of the intra mode difference for the block and the threshold and based on whether bidirectional intra prediction coding is applied for the block, which one of the non-smoothing interpolation filter and the smoothing interpolation filter to apply to the unfiltered reference samples of the block.

6. The method of claim 1, wherein the smoothing interpolation filter is a Gaussian interpolation filter and the non-smoothing interpolation filter is a cubic interpolation filter.

7. A method of encoding video data, the method comprising:
- determining an intra mode difference for a block of a current picture of the video data, wherein determining the intra mode difference for the block comprises determining the intra mode difference for the block as a minimum of: (1) an absolute value of a difference between an intra mode index for the block and an intra mode index of a horizontal intra prediction mode, and (2) an absolute value of a difference between the intra mode index for the block and an intra mode index of a vertical intra prediction mode;
- determining, based at least in part on a comparison of the intra mode difference for the block and a threshold, which one of a non-smoothing interpolation filter and a smoothing interpolation filter to apply to unfiltered reference samples of the block;
- based on the determination, applying the non-smoothing interpolation filter or the smoothing interpolation filter to the unfiltered reference samples of the block to generate predictive samples of the block; and
- generating residual data for the block based on the predictive samples of the block.

8. The method of claim 7, wherein the smoothing interpolation filter is a Gaussian interpolation filter and the non-smoothing interpolation filter is a cubic interpolation filter.

9. A device for encoding or decoding video data, the device comprising:
- a memory storing the video data; and
- one or more processors configured to:
  - determine an intra mode difference for a block of a current picture of the video data, wherein determining the intra mode difference for the block comprises determining the intra mode difference for the block as a minimum of: (1) an absolute value of a difference between an intra mode index for the block and an intra mode index of a horizontal intra prediction mode, and (2) an absolute value of a difference between the intra mode index for the block and an intra mode index of a vertical intra prediction mode;
  - determine, based at least in part on a comparison of the intra mode difference for the block and a threshold, which one of a non-smoothing interpolation filter and a smoothing interpolation filter to apply to unfiltered reference samples of the block; and
  - based on the determination, apply the non-smoothing interpolation filter or the smoothing interpolation filter to the unfiltered reference samples of the block to generate predictive samples of the block.

10. The device of claim 9, wherein the one or more processors are configured to determine, based on one or more additional conditions, which one of the non-smoothing interpolation filter and the smoothing interpolation filter to apply to the unfiltered reference samples of the block.

11. The device of claim 10, wherein the one or more additional conditions include one or more of: dependencies on luma or chroma, usage of a position dependent intra prediction combination tool, or usage of a non-separable secondary transform.

12. The device of claim 9, wherein the one or more processors are configured to, as part of determining which one of the non-smoothing interpolation filter and the smoothing interpolation filter to apply to the unfiltered reference samples of the block, determine, based on the comparison of the intra mode difference for the block and the threshold and based on a property of interpolation filters used in one or more neighboring blocks of the block, which one of the non-smoothing interpolation filter and the smoothing interpolation filter to apply to the unfiltered reference samples of the block.

13. The device of claim 9, wherein the one or more processors are configured to, as part of determining which one of the non-smoothing interpolation filter and the smoothing interpolation filter to apply to the unfiltered reference samples of the block, determine, based on the comparison of the intra mode difference for the block and the threshold and based on whether bidirectional intra prediction coding is applied for the block, which one of the non-smoothing interpolation filter and the smoothing interpolation filter to apply to the unfiltered reference samples of the block.

14. The device of claim 9, wherein the smoothing interpolation filter is a Gaussian interpolation filter and the non-smoothing interpolation filter is a cubic interpolation filter.

15. The device of claim 9, wherein the one or more processors are configured to reconstruct the block based on the predictive samples of the block.

16. The device of claim 9, wherein the one or more processors are configured to:
- generate residual data for the block based on the predictive samples of the block; and
- include, in a bitstream that includes an encoded representation of the video data, data representing the residual data for the block.

17. The device of claim 9, wherein the condition is dependent on one or more of an intra mode, a distance of a sample from a block boundary, or block dimensions.

18. The device of claim 9, further comprising a display configured to display decoded video data.

19. The device of claim 9, wherein the device comprises one or more of a camera, a computer, a mobile device, or a set-top box.

20. A device for encoding or decoding video data, the device comprising:
- means for determining an intra mode difference for a block of a current picture of the video data, wherein the means for determining the intra mode difference for the block comprises means for determining the intra mode difference for the block as a minimum of: (1) an absolute value of a difference between an intra mode index for the block and an intra mode index of a horizontal intra prediction mode, and (2) an absolute value of a difference between the intra mode index for the block and an intra mode index of a vertical intra prediction mode;
- means for determining, based at least in part on a comparison of the intra mode difference for the block and a threshold, which one of a non-smoothing interpolation filter and a smoothing interpolation filter to apply to unfiltered reference samples of the block; and;
- means for applying, based on the determination, the non-smoothing interpolation filter or the smoothing interpolation filter to the unfiltered reference samples of the block to generate predictive samples of the block.

21. A non-transitory computer-readable storage medium having stored thereon instructions that, when executed, cause one or more processors to:
- determine an intra mode difference for a block of a current picture of video data, wherein the instructions that cause the one or more processors to determine the intra mode difference for the block comprise instructions that, when executed, cause the one or more processors to determine the intra mode difference for the block as a minimum of: (1) an absolute value of a difference between an intra mode index for the block and an intra mode index of a horizontal intra prediction mode, and (2) an absolute value of a difference between the intra mode index for the block and an intra mode index of a vertical intra prediction mode;

determine, based at least in part on a comparison of the intra mode difference for the block and a threshold, which one of a non-smoothing interpolation filter and a smoothing interpolation filter to apply to unfiltered reference samples of the block; and;

based on the determination, apply the non-smoothing interpolation filter or the smoothing interpolation filter to the unfiltered reference samples of the block to generate predictive samples of the block.

* * * * *